(12) United States Patent
Nobe

(10) Patent No.: US 9,546,919 B2
(45) Date of Patent: Jan. 17, 2017

(54) ELECTRONIC APPARATUS AND SHOCK DETECTION METHOD

(71) Applicant: SEIKO INSTRUMENTS INC., Chiba (JP)

(72) Inventor: Tetsuya Nobe, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 313 days.

(21) Appl. No.: 14/211,759

(22) Filed: Mar. 14, 2014

(65) Prior Publication Data

US 2014/0290385 A1    Oct. 2, 2014

(30) Foreign Application Priority Data

Mar. 27, 2013 (JP) ................... 2013-066884
Jan. 27, 2014 (JP) ................... 2014-012659

(51) Int. Cl.
*G01L 1/16* (2006.01)
*G04C 21/02* (2006.01)
*G04G 13/02* (2006.01)

(52) U.S. Cl.
CPC ............... *G01L 1/162* (2013.01); *G04C 21/02* (2013.01); *G04G 13/021* (2013.01)

(58) Field of Classification Search
CPC ....................................... G01L 1/162
See application file for complete search history.

(56) References Cited

U.S. PATENT DOCUMENTS

| | | | | |
|---|---|---|---|---|
| 4,232,241 A | * | 11/1980 | Hamatani | B06B 1/0215 310/317 |
| 4,529,322 A | * | 7/1985 | Ueda | G04G 19/02 318/116 |
| 5,350,962 A | * | 9/1994 | Sakaida | H02N 2/067 310/316.01 |
| 5,635,788 A | * | 6/1997 | Soltermann | B06B 1/0238 310/317 |
| 5,878,004 A | * | 3/1999 | Miyauchi | G04G 13/021 368/230 |
| 5,940,348 A | * | 8/1999 | Murakami | G04C 10/04 368/11 |

(Continued)

FOREIGN PATENT DOCUMENTS

EP    1833103    9/2007

OTHER PUBLICATIONS

Patent Abstracts of Japan, Publication No. 63-079091, Publication Date Apr. 9, 1988.

*Primary Examiner* — Lisa Caputo
*Assistant Examiner* — Tran M Tran
(74) *Attorney, Agent, or Firm* — Adams & Wilks

(57) ABSTRACT

An electronic apparatus includes an outer case, and a piezoelectric element mounted to an inner surface of the outer case and configured to impart vibration to the outer case due to deformation in correspondence with an applied voltage and to generate a voltage corresponding to deformation due to a shock imparted to the outer case. An induction element applies an increased voltage to the piezoelectric element, a first switch performs control as to whether or not to supply an electric current from a power source to the induction element, a second switch effects connection or disconnection between the induction element and the piezoelectric element, and a shock detection unit to detects a shock imparted to the outer case based on the voltage generated in the piezoelectric element.

20 Claims, 12 Drawing Sheets

(56) References Cited

U.S. PATENT DOCUMENTS

| | | | | |
|---|---|---|---|---|
| 5,973,469 A * | 10/1999 | Higuchi | ............... | H02P 6/20 318/254.1 |
| 5,977,688 A * | 11/1999 | Utsunomiya | ......... | H01L 41/107 310/316.01 |
| 6,327,127 B1 * | 12/2001 | Utsunomiya | ......... | G04C 10/00 307/130 |
| 6,407,507 B1 * | 6/2002 | Kimball | ............... | H05B 33/08 315/169.3 |
| 6,522,603 B1 * | 2/2003 | Miyahara | ............... | G04C 10/00 368/203 |
| 6,577,559 B1 * | 6/2003 | Fleury | ............... | B06B 1/0215 310/321 |
| 6,580,665 B1 * | 6/2003 | Kamiyama | ............ | G04G 19/12 368/204 |
| 6,763,726 B2 * | 7/2004 | Yamashita | ............ | G01P 15/09 310/26 |
| 6,813,223 B1 * | 11/2004 | Born | ............... | G04G 13/021 368/255 |
| 6,816,440 B2 * | 11/2004 | Born | ............... | G04G 21/08 368/69 |
| 7,570,135 B2 * | 8/2009 | Nishino | ............... | H03H 3/02 29/25.35 |
| 7,777,680 B2 * | 8/2010 | Abe | ............... | G04C 3/14 343/718 |
| 7,817,500 B2 * | 10/2010 | Chan | ............... | G04G 13/021 310/318 |
| 8,890,391 B2 * | 11/2014 | Koyama | ............ | G01P 15/097 310/330 |
| 8,966,980 B2 * | 3/2015 | Koyama | ............ | G01P 1/023 73/579 |
| 9,016,128 B2 * | 4/2015 | Koyama | ............ | G01P 1/00 73/579 |
| 2002/0118605 A1 | 8/2002 | Born et al. | ............... | 368/69 |
| 2008/0024265 A1 * | 1/2008 | Jones | ............... | G01R 29/085 338/252 |

* cited by examiner

|       | A   | B   | C'  | C   |
|-------|-----|-----|-----|-----|
| 123-1 | ON  | OFF | ON  | OFF |
| 123-2 | ON  | ON  | OFF | OFF |

ELECTRONIC APPARATUS AND SHOCK DETECTION METHOD

BACKGROUND OF THE INVENTION

Field of the Invention

The present invention relates to an electronic apparatus and a shock detection method.

Description of the Related Art

Conventionally, there have been available electronic apparatuses configured to generate an alarm sound when a predetermined time is attained in time measurement. One of such electronic apparatuses is equipped with a mechanism allowing the user to stop the alarm sound generated by imparting a shock to the electronic apparatus.

For example, JP-A-63-79091 discloses an alarm electronic timepiece having a first piezoelectric element firmly attached to a part of a timepiece case member for generating an alarm sound, a second piezoelectric element for detecting a shock applied to a timepiece case, a detection circuit configured to detect a voltage signal generated by the second piezoelectric element, a level discrimination circuit configured to output solely an output signal of not less than a fixed level of output signals of the detection circuit, and a timepiece circuit for performing time measurement or the like. The electronic timepiece is equipped with a switch device for the electronic timepiece which, even when an alarm signal for generating an alarm sound is being applied to the first piezoelectric element due to the timepiece circuit, operates the detection circuit and the timepiece circuit by the voltage signal of the second piezoelectric element generated by an impact force applied to the timepiece case.

Further, the switch device of the electronic timepiece disclosed in JP-A-63-79091 is formed as follows: for the first piezoelectric element and the second piezoelectric element, there is provided a common electrode extending over substantially the entire area of a first surface of the same piezoelectric material; two independent electrodes are provided on a second surface thereof; the first surface is press-fitted to the timepiece case; one electrode provided on the second surface is formed as the electrode of the first piezoelectric element; and the other electrode is formed as the electrode of the second piezoelectric element.

However, the switch device for the electronic timepiece disclosed in JP-A-63-79091 is equipped with a second piezoelectric element for detecting a shock independently of the first piezoelectric element for generating an alarm sound, resulting in an increase in the number of components. To achieve a reduction in the apparatus size, a piezoelectric element of a small size is used as each piezoelectric element, whereby the maximum volume of the alarm sound that can be generated is reduced, and the signal value of the shock detected is reduced, so that the detection of the shock is rather difficult. Further, when a common electrode for the first piezoelectric element and the second piezoelectric element is provided so as to extend over substantially the entire area of a first surface of the same piezoelectric material, a step-up coil may be connected in parallel with the first piezoelectric element in order to apply a large voltage to the first piezoelectric element for generating an alarm sound. The step-up coil exhibits high impedance with respect to a high frequency signal, and low impedance with respect to a low frequency signal. Thus, with respect to a signal corresponding to a shock of lower frequency than the alarm sound, it is substantially brought into conduction, so that it is difficult to detect such a shock.

SUMMARY OF THE INVENTION

It is an aspect of the present application to provide an electronic apparatus equipped with a mechanism generating a sound or an oscillation, and a shock detection method, wherein it is possible to detect an imparted shock with high sensitivity.

According to another aspect of the present application, there is provided an electronic apparatus including: an oscillation unit; a piezoelectric element configured to impart an oscillation due to deformation in correspondence with an applied voltage to the oscillation unit, generating a voltage corresponding to deformation due to a shock imparted to the oscillation unit; an induction element for applying an increased voltage to the piezoelectric element; a first switch performing control as to whether or not to supply an electric current from a power source to the induction element; a second switch for effecting connection or disconnection between the induction element and the piezoelectric element; and a shock detection unit configured to detect a shock imparted to the oscillation unit based on the voltage generated in the piezoelectric element.

According to another aspect of the present application, there is provided the above-mentioned electronic apparatus, wherein the first switch performs control so as to supply no electric current to the induction element; and, when the second switch effects disconnection between the induction element and the piezoelectric element, the shock detection unit detects the shock imparted to the oscillation unit.

According to still another aspect of the present application, there is provided the above-mentioned electronic apparatus, wherein the shock detection unit performs sampling on the voltage generated in the piezoelectric element each time disconnection is effected between the induction element and the piezoelectric element, detecting the shock imparted to the oscillation unit based on the voltage on which sampling has been performed.

According to yet another aspect of the present application, there is provided the above-mentioned electronic apparatus, wherein the shock detection unit compensates for the DC component of the voltage generated in the piezoelectric element.

According to another aspect of the present application, there is provided the above-mentioned electronic apparatus, further including: a control unit configured to perform control as to whether or not the second switch should disconnect between the induction element and the piezoelectric element based on the voltage generated in the piezoelectric element.

According to another aspect of the present application, there is provided the above-mentioned electronic apparatus, wherein a resistor element is connected in parallel with the induction element.

According to another aspect of the present application, there is provided the above-mentioned electronic apparatus, wherein the piezoelectric element is connected to one end of the resistor element; and the other end of the resistor element is grounded.

According to another aspect of the present application, there is provided the above-mentioned electronic apparatus, further including: a switch control unit configured to effect disconnection between one end and the other end of the first switch and to effect connection between one end and the other end of the first switch before the second switch disconnects between the induction element and the piezoelectric element; one end of the first switch is connected to the induction element and the piezoelectric element; and the other end of the first switch is grounded via a resistor element.

According to another aspect of the present application, there is provided a shock detection method for an electronic apparatus including: an oscillation unit; a piezoelectric element configured to impart an oscillation due to deformation in correspondence with an applied voltage to the oscillation unit, generating a voltage corresponding to the deformation due to a shock imparted to the oscillation unit; and an induction element for applying an increased voltage to the piezoelectric element, the method including: a first step of performing control as to whether or not to supply an electric current from a power source to the induction element; a second step of connecting or disconnecting between the induction element and the piezoelectric element; and a third step of detecting a shock imparted to the oscillation unit based on the voltage generated in the piezoelectric element.

According to the present application, it is possible to provide an electronic apparatus equipped with a mechanism for generating a sound and an oscillation, wherein it is possible to detect an imparted shock with high sensitivity.

DESCRIPTION OF THE PREFERRED EMBODIMENTS (First Embodiment)

In the following, the first embodiment of the present invention will be described with reference to the drawings.

Figure 1:
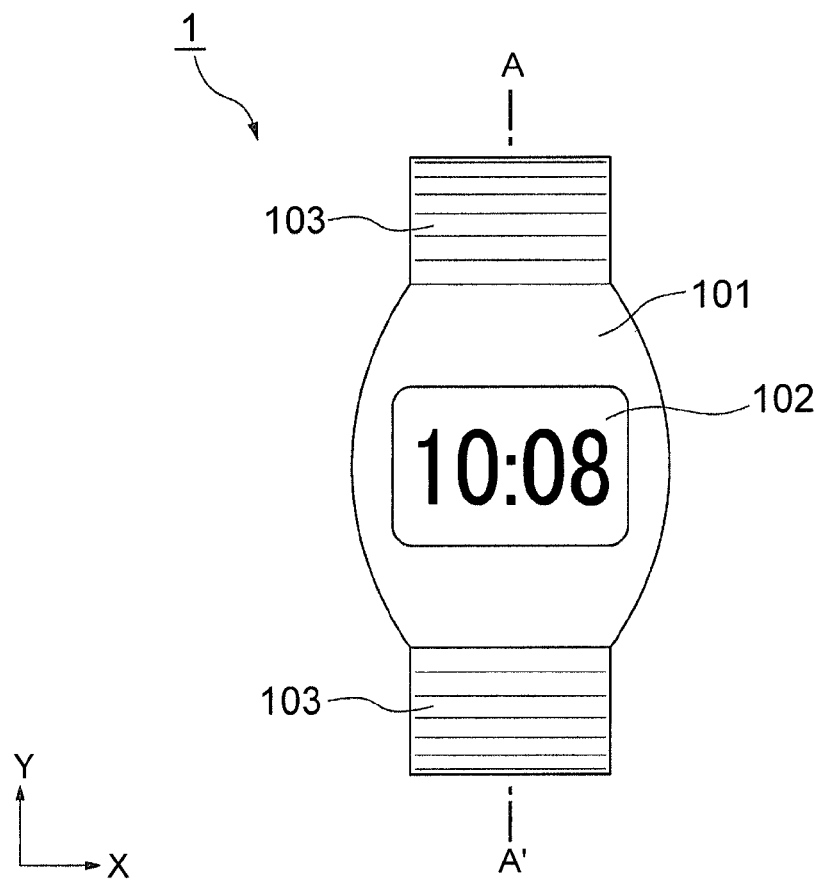
FIG. 1 is a front surface view illustrating the outward appearance of an electronic apparatus according to a first embodiment of the present invention.

FIG. 1 is a front surface view illustrating the outward appearance of an electronic apparatus 1 according to the present embodiment.

The electronic apparatus 1 consists, for example, of an electronic timepiece such as a wristwatch, or a clock configured to indicate time. In the example described below, the electronic apparatus 1 consists of a wristwatch.

In FIG. 1, the X-direction extends to the right, and the Y-direction extends vertically upwards with respect to the plane of the drawing. The line AA' is a segment which is parallel to the Y-direction and which passes substantially the central portion of the electronic apparatus 1.

The electronic apparatus 1 includes a case 101, a display unit 102, and a belt 103.

The case 101 is a casing accommodating the elements, circuits, and other components constituting the electronic apparatus 1.

The display unit 102 displays time and other data measured by the electronic apparatus 1. The display unit 102 consists, for example, of a liquid crystal display (LCD). The belt 103 is a fastening member for fastening the electronic apparatus 1 to a portion of the body of the user, for example, the arm. The belt 103 may be omitted in the electronic apparatus 1.

Figure 2:
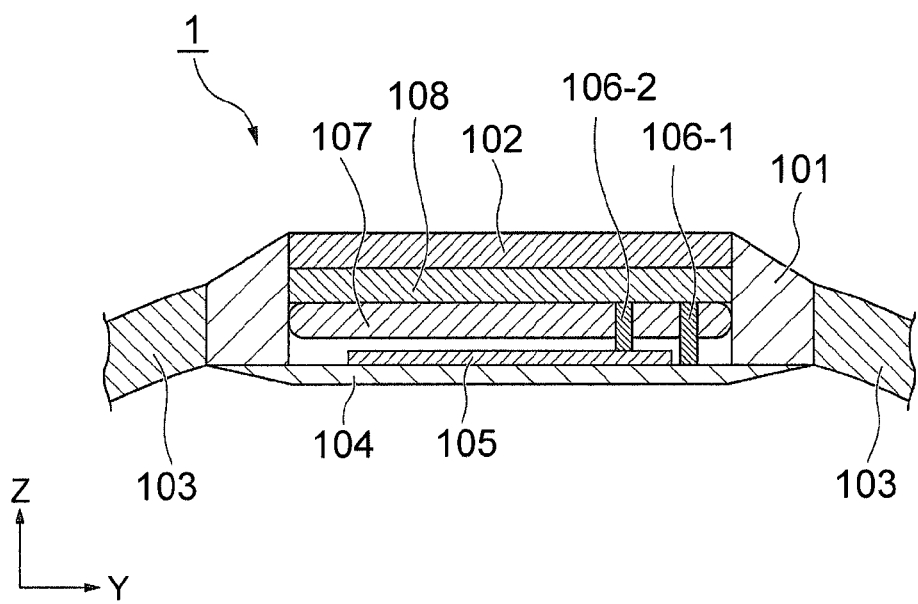
FIG. 2 is a sectional view of the electronic apparatus according to the present embodiment.

FIG. 2 is a sectional view of the electronic apparatus 1 according to the present embodiment.

FIG. 2 is a sectional view taken along the line AA' of FIG. 1. In FIG. 2, the Y-direction extends to the right, and the Z-direction extends vertically upwards as seen in the plane of the drawing. In FIG. 2, the upper side corresponds to the front side, and the lower side corresponds to the back side.

Apart from the case 101, the display unit 102, and the belt 103 shown in FIG. 1, the electronic apparatus 1 includes a case back (oscillation unit) 104, a piezoelectric element 105, two electrodes 106-1 and 106-2, a power source 107, and a substrate 108.

The case back 104 vibrates in response to an oscillation transmitted from the back surface of the piezoelectric element 105. The air around the case back 104 is vibrated through this oscillation, whereby a sound is generated. Further, the case back 104 undergoes deformation due to a shock imparted thereto from the outside, and transmits the shock to the piezoelectric element 105 to thereby deform the piezoelectric element 105. The case back 104 is held in close contact with the case 101, and protects the components accommodated in the case 101 from a shock and water from the outside. The back surface of the piezoelectric element 105 faces the inner wall of the case back 104. The case back 104 may be formed of the same material as the case 101, or may be detachably fit-engaged with the case 101.

The piezoelectric element 105 is an element configured to undergo deformation in response to a shock transmitted to the interior of the case back 104, and to generate a voltage between both surfaces thereof in correspondence with the deformation. When a voltage is applied between the front surface and the back surface of the piezoelectric element 105, the piezoelectric element 105 undergoes deformation in correspondence with the voltage to thereby generate an oscillation, and transmits the generated oscillation to the case back 104. The piezoelectric element 105 is an element the main component of which is, for example, lead zirconate titanate (PZT). The piezoelectric element 105 has a capacitance; when a voltage is applied between the front surface and the back surface thereof, electric charge is accumulated, and when the application of the voltage is released, the accumulated electric charge is discharged.

The electrodes 106-1 and 106-2 are respectively in contact with the back surface and the front surface of the piezoelectric element 105. By applying a voltage between the electrodes 106-1 and 106-2, the voltage is applied between the back surface and the front surface of the piezoelectric element 105. Thus, the piezoelectric element 105 is deformed in response to a change in the voltage applied between the electrodes 106-1 and 106-2, whereby an oscillation is generated.

The power source 107 is a power source configured to supply a DC electric power to each portion of the electronic apparatus 1, e.g., a control unit 110 (described below). The power source 107 is equipped with a positive pole terminal and a negative pole terminal. The positive pole terminal is connected to the back surface of the piezoelectric element 105 via the electrode 106-2. The voltage at the positive pole terminal is a power source voltage $V_{cc}$. The negative pole terminal is grounded. The power source 107 may be a secondary battery such as a nickel-hydrogen battery capable of both storage and discharge, or may be a primary battery such as a copper oxide lithium battery, which, while not capable of storage, is capable of discharge.

The components such as the display unit 102, the electrodes 106-1 and 106-2, the power source 107, and the control unit 110 (described below) are supported by the substrate 108, and are fixed in their respective positions.

Figure 3:
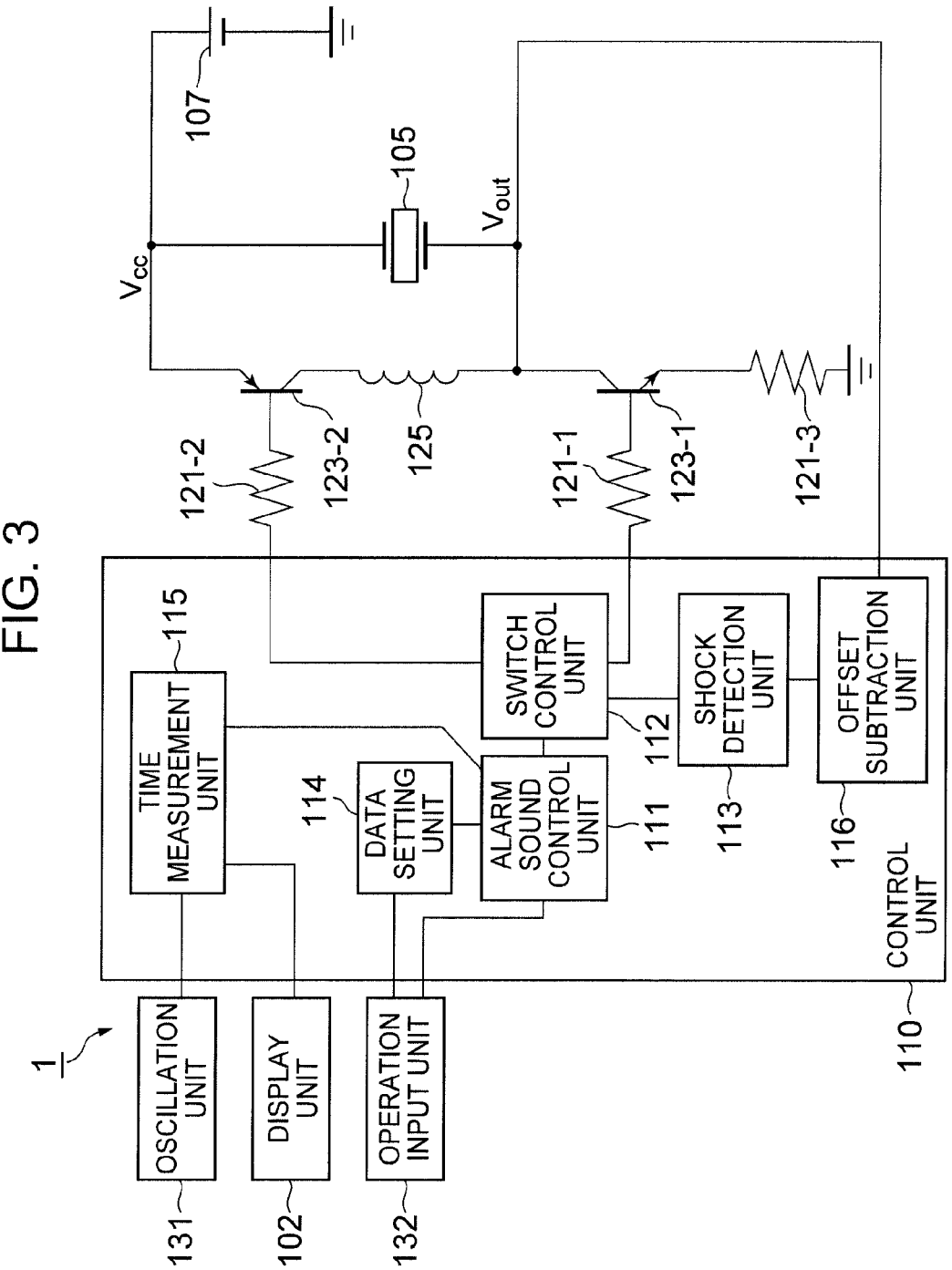
FIG. 3 is a schematic block diagram illustrating the construction of the electronic apparatus according to the present embodiment.

FIG. 3 is a schematic block diagram illustrating the construction of the electronic apparatus 1 according to the present embodiment.

Apart from the display unit 102, the piezoelectric element 105, and the power source 107 shown in FIG. 2, the electronic apparatus 1 includes the control unit 110, three resistor elements 121-1 through 121-3, two switches 123-1 and 123-2, an induction element 125, an oscillation unit 131, and an operation input unit 132.

The control unit 110 includes an alarm sound control unit 111, a switch control unit 112, a shock detection unit 113, a data setting unit 114, a time measurement unit 115, and an offset subtraction unit 116.

The alarm sound control unit 111 performs control as to whether or not to generate a sound (alarm sound) through oscillation of the case back 104. The alarm sound control unit 111 determines whether or not the time indicated by time data input from the time measurement unit 115 has attained an alarm sound time indicated by alarm sound information stored in the data setting unit 114. When it is determined that the alarm sound time has been attained, the alarm sound control unit 111 generates an alarm sound instruction signal instructing to give an alarm sound, and outputs the generated alarm sound instruction signal to the switch control unit 112.

When an alarm sound operation signal is input from the operation input unit 132, the alarm sound control unit 111 may generate an alarm sound instruction signal and output the generated alarm sound instruction signal to the switch control unit 112. Here, the alarm sound operation signal is a signal instructing to give an alarm sound; it is a signal generated by the operation input unit 132 in response to operation input by the user. The alarm sound operation signal is generated, for example, when a predetermined button provided in the operation input unit 132 is depressed.

When the alarm sound instruction signal is input from the alarm sound control unit 111, the switch control unit 112 generates two kinds of switch control signals In1 and In2. The switch control unit 112 outputs the generated switch control signals In1 and In2 to the switches 123-1 and 123-2, respectively, via the resistor elements 121-1 and 121-2. Further, the switch control unit 112 outputs the switch control signals In1 and In2 to the shock detection unit 113. The switch control signals In1 and In2 are signals for controlling as to whether to effect connection (conduction or closed state) or disconnection (insulation or open state) between one end and the other end of each of the switches 123-1 and 123-2. In the following description, the state in which one end and the other end of each switch are connected to each other may be referred to as the connection state, and the state in which one end and the other end of each switch are disconnected from each other may be simply referred to as the disconnection state. Between the switch control signals In1 and In2, the cycle (switch control cycle, e.g., 0.5 msec) for controlling whether to place the switches 123-1 and 123-2 in the connection state or the disconnection state is the same. The switch control signal In1 is, for example, an electric signal in which a predetermined voltage value $V_{1L}$ (low voltage value, e.g., 0.0 V) and a voltage value $V_{1H}$ (high voltage value, e.g., 3.0 V) higher than the voltage value $V_{1L}$ are alternately repeated in a switch control cycle. The switch control signal In2 is also an electric signal in which, for example, a predetermined low voltage value $V_{2L}$ (e.g., 0.0 V) and a high voltage value $V_{2H}$ (e.g., 3.0 V) higher than the low voltage value $V_{2L}$ are alternately repeated in the switch control cycle.

However, between the switch control signals In1 and In2, there is a difference in the timing with which the switches 123-1 and 123-2 are controlled to the connection state or the disconnection state. The switch control signals In1 and In2 indicate one of the following states: a case in which both the switches 123-1 and 123-2 are controlled to the connection state (state A); a case in which the switch 123-1 is controlled to the disconnection state and in which the switch 123-2 is controlled to the connection state (state B); and a case in which both the switches 123-1 and 123-2 are controlled to the disconnection state (state C). The sum total of the respective continuation times of the state A, state B, and state C is equal to the switch control cycle. The states are repeated in the order: state A, state B, and state C. An example of the switch control signals In1 and In2 will be described below.

In this switch control cycle, at least the states A and B are repeated, whereby the voltage applied between the front surface and the back surface of the piezoelectric element 105 is changed. For, as described below, when the switch 123-2 is in the connection state, it is controlled whether or not to supply an electric current from the power source 107 to the induction element 125 according to whether the switch 123-1 is in the connection state or the disconnection state, i.e., whether it is in the state A or state B. As a result, the deformation amount of the piezoelectric element 105 is changed, and the case back 104 vibrates, so that a sound is generated. Thus, the fundamental frequency of the generated sound is equal to the reciprocal number of the switch control cycle. An example of the output voltage $V_{out}$ at the front surface of the piezoelectric element 105 will be described below.

In response to the input of the alarm sound instruction signal, the switch control unit 112 outputs the switch control signals In1 and In2 to the switches 123-1 and 123-2, respectively. As a result, a sound is generated. The switch control unit 112 may perform control as to whether or not to generate a sound based on whether or not the switch control signals In1 and In2 are output. The time series (alarm sound pattern) consisting of a state in which a sound is generated and a state in which no sound is generated may be of any type. For example, from the point in time when the alarm sound instruction signal is input, the switch control unit 112 repeats the state in which the switch control signals In1 and In2 are output and the state in which they are not output, alternately a predetermined number of times (e.g., 240 times) at a predetermined alarm sound frequency. The alarm sound cycle is a cycle longer than the switch control cycle, e.g., 0.25 sec. As a result, the sound intermittence is repeated the predetermined number of times at the alarm sound cycle.

When an alarm sound stop signal instructing to stop the alarm sound is input from the shock detection unit 113, the switch control unit 112 stops the output of the switch control signals In1 and In2. As a result, the change in the voltage applied between the front surface and the back surface of the piezoelectric element 105 is stopped, and the deformation amount of the piezoelectric element 105 is fixed, so that the oscillation of the case back 104 stops. Thus, the alarm sound from the case back 104 stops.

Input to the shock detection unit 113 are the switch control signals In1 and In2 from the switch control unit 112, and a subtraction output signal (shock detection signal) from the offset subtraction unit 116. The subtraction output signal is an electric signal having a voltage $V_d$ obtained by subtracting a predetermined voltage (offset voltage) $V_{th}$ from the output voltage $V_{out}$ at the offset subtraction unit 116. Each time the input switch control signals In1 and In2 exhibit a condition C, the shock detection unit 113 performs sampling on the voltage $V_d$ of the subtraction output signal. Thus, the sampling cycle is equal to the switch control cycle. The shock detection unit 113 detects the shock imparted to the case back 104 based on the voltage $V_d$ of the subtraction output signal having undergone sampling. When, for example, the voltage $V_d$ of the subtraction output signal is larger than a predetermined detection threshold value voltage, the shock detection unit 113 determines that a shock has been imparted, and generates the alarm sound stop signal. The shock detection unit 113 outputs the generated alarm sound stop signal to the switch control unit 112. An example of the output voltage $V_{out}$ and of the voltage $V_d$ of the subtraction output signal will be described below.

The data setting unit 114 sets data to be used for the operation of the electronic apparatus 1 in correspondence with a data setting signal input from the operation input unit 132. The data setting unit 114 is equipped, for example, with a well-known data setting mechanism, selects one alarm sound time candidate by using the input data setting signal, and stores alarm sound time information indicating the candidate selected. The data setting signal is generated, for example, when it is detected that a predetermined button provided in the operation input unit 132 has been depressed.

The time measurement unit 115 measures the present time based on a measurement signal input from the oscillation unit 131. The measurement signal is a signal serving as a reference for time measurement. The time measurement unit 115 measures time by, for example, counting the number of signal value peaks that the measurement signal has. The time measurement unit 115 generates time data indicating the time measured, and outputs the generated time data to the display unit 102 and the alarm sound control unit 111.

The offset subtraction unit 116 is connected to the front surface of the piezoelectric element 105, the other end of the induction element 125, and one end of the switch 123-1, and an electric signal is input from the contact thereof. The voltage that the electric signal has will be referred to as the output voltage $V_{out}$. The offset subtraction unit 116 subtracts the predetermined offset voltage $V_{th}$ from the output voltage $V_{out}$ to generate a subtraction output signal having the voltage $V_d$. The offset subtraction unit 116 outputs the generated subtraction output signal to the shock detection unit 113. As described below, the output voltage $V_{out}$ is of a value obtained through addition of the contribution due to the shock imparted to the case back 104 and the voltage of a fixed DC component (also referred to as the offset amount) that does not fluctuate with passage of time. In the offset subtraction unit 116, the offset amount contained in the output voltage $V_{out}$ is compensated for by subtracting the offset voltage $V_{th}$ that is equal to the offset amount.

The resistor element 121-1 is a resistor element having a predetermined electrical resistance value $R_1$, and one end thereof is connected to the switch control unit 112; and the other end of the resistor element 121-1 is connected to the control end of the switch 123-1. The resistor element 121-2 is a resistor element having a predetermined electrical resistance value $R_2$; one end thereof is connected to the switch control unit 112, and the other end of the resistor element 121-2 is connected to the control end of the switch 123-2. The resistor element 121-3 is a resistor element having a predetermined electrical resistance value $R_3$; one end thereof is connected to the other end of the switch 123-1, and the other end of the resistor element 121-3 is grounded.

Each of the switches 123-1 and 123-2 is equipped with three terminals, and the three terminals correspond to the above-mentioned one end, other end, and control end. One end of the switch 123-1 is connected to the other end of the induction element 125, the front surface of the piezoelectric element 105, and the offset subtraction unit 116; and the other end of the switch 123-1 is connected to one end of the resistor element 121-3, and the control end of the switch 123-1 is connected to the other end of the resistor element 121-1. The switch 123-1 is controlled to the connection state or the disconnection state based on the switch control signal In1 input from the switch control unit 112 via the resistor element 121-1.

The switch 123-1 is, for example, an NPN-type transistor. The terminals of the emitter (E), the base (B), and the collector (C) of the NPN-type transistor respectively correspond to the above-mentioned other end, control end, and one end. When the switch control signal In1 input to the control end exhibits a low voltage value $V_{1L}$, the switch 123-1 is controlled to the disconnection state, and insulation is effected between one end and the other end. When the switch control signal In1 input to the control end exhibits a high voltage value $V_{1H}$, the switch 123-1 is controlled to the connection state, and conduction is effected between one end and the other end.

One end of the switch 123-2 is connected to the positive pole terminal of the power source 107 and to the back surface of the piezoelectric element 105, and the other end of the switch 123-2 is connected to one end of the induction element 125. The control end of the switch 123-2 is connected to the other end of the resistor element 121-2. The switch 123-2 is controlled to the connection state or the disconnection state based on the switch control signal In2 input from the switch control unit 112 via the resistor element 121-2.

The switch 123-2 is, for example, a PNP-type transistor. The terminals of the collector (C), the base (B), and the emitter (E) of the PNP-type transistor respectively correspond to the above-mentioned other end, control end, and one end. When the switch control signal In2 input to the control end exhibits a low voltage value $V_{2L}$, the switch 123-2 is controlled to the connection state, and conduction is effected between one end and the other end. When the switch control signal In2 input to the control end exhibits a high voltage value $V_{2H}$, the switch 123-2 is controlled to the disconnection state, and insulation is effected between one end and the other end.

The induction element 125 is an element configured to generate an induced electromotive force between enter one end and the other end thereof in correspondence with the time fluctuation in the magnitude of the electric current caused to flow between one end and the other end thereof. The induction element 125 is a coil such as a boosting coil. One end of the induction element 125 is connected to the other end of the switch 123-2, and the other end of the induction element 125 is connected to one end of the switch 123-1, the front surface of the piezoelectric element 105, and the offset subtraction unit 116. The inductance L of the induction element 125 is previously selected such that the absolute value $\omega_0 L$ of the impedance thereof is larger than the resistance $R_3$ of the resistor element 121-3. Symbol $\omega_0$ indicates a fundamental frequency $2\pi/T_0$ corresponding to the switch control cycle $T_0$.

Further, when the switch 123-1 is controlled to the disconnection state, and the switch 123-2 is controlled to the connection state, one end and the other end of the induction element 125 are respectively connected to the back surface and the front surface of the piezoelectric element 105. As a result, the induction element 125 and the piezoelectric element 105 form a resonance circuit the voltage of which is changed at a resonance frequency $f_0$, and the voltage boosted by the induction element 125 is applied to the piezoelectric element 105. The resonance frequency $f_0$ is $1/2\pi(LC_c)^{-1/2}$. Symbol $C_c$ indicates the capacitance of the piezoelectric element 105.

The oscillation unit 131 generates an oscillation signal exhibiting a predetermined frequency (e.g., 32,768 Hz). The oscillation unit 131 is equipped, for example, with a quartz oscillator. The oscillation unit 131 performs frequency division (e.g., 100 Hz) on the oscillation signal generated to generate a measurement signal, and outputs the generated measurement signal to the time measurement unit 115.

The operation input unit 132 detects the operation input by the user, and generates an operation signal corresponding to the detected operation input. The operation input unit 132 outputs the generated operation signal to the control unit 110. The operation input unit 132 detects, for example, that a button (not shown) provided on the surface of the electronic apparatus 1 has been depressed by the user. The operation input unit 132 may generate the above-mentioned alarm sound operation signal when the depression of the button is detected, and output the generated alarm sound operation signal to the alarm sound control unit 111. The operation input unit 132 may generate the data setting signal when the depression of the button is detected, and output the generated data setting signal to the data setting unit 114.

Next, an example of the output voltage $V_{out}$ and of the sampling time of the subtraction output signal will be described in relation to the switch control signals In1 and In2.

Figure 4:
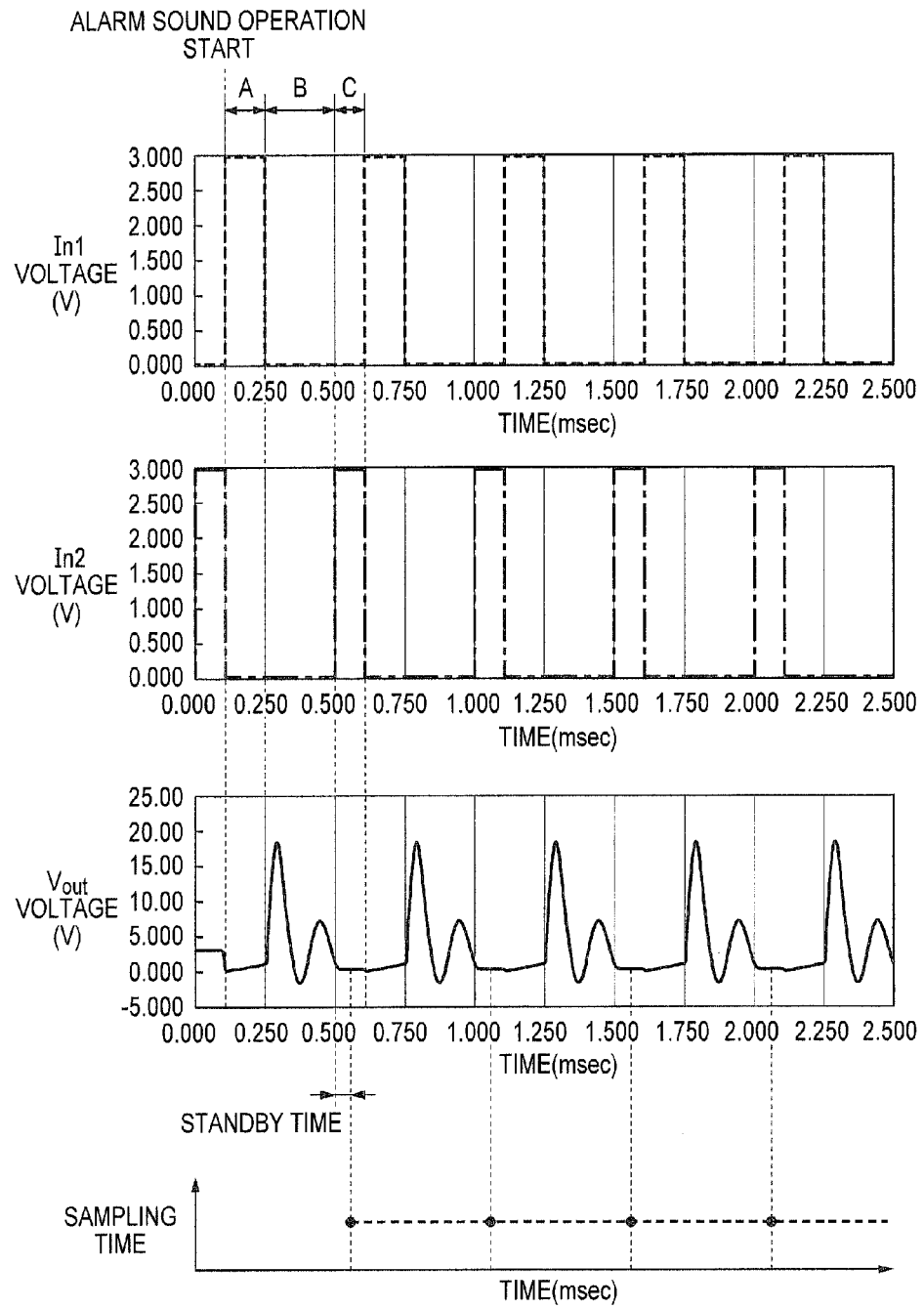
FIG. 4 is a diagram illustrating an example of an output voltage and of a subtraction output signal sampling time.

FIG. 4 is a diagram illustrating an example of the output voltage $V_{out}$ and of the sampling time of the subtraction output signal.

In each stage of FIG. 4, the horizontal axis indicates time. The uppermost stage illustrates the voltage of the switch control signal In1, the second stage illustrates the voltage of the switch control signal In2, the third stage illustrates the output voltage $V_{out}$ and the lowermost stage illustrates the sampling time of the subtraction output signal. In the first through third stages, the vertical axis indicates voltage. In the example shown in FIG. 4, the switch control cycle is 0.5 msec, and the alarm sound operation start at time 0.1 msec is the starting point of the switch control. The waveforms of the switch control signal In1, the switch control signal In2, and the output voltage $V_{out}$ are repeated for each switch control cycle.

In FIG. 4, in the switch control cycle from time 0.1 msec to 0.6 msec, the sections indicated by arrows with symbols A, B, and C at the upper end of the uppermost stage are sections A, B, and C. The sections A, B, and C are sections in which the switch control signals In1 and In2 are respectively in the states A, B, and C. Each switch control cycle includes the sections A, B, and C in that order. The continuation times of the sections A, B, and C are respectively 0.15 msec, 0.25 msec, and 0.1 msec.

In the example shown in FIG. 4, the switch control signal In1 is an electric signal exhibiting a high voltage value $V_{1H}$ of 3.0 V in the section A, and exhibiting a low voltage value $V_{1L}$ of 0.0 V in the sections B and C. Thus, the switch 123-1 is controlled to the connection state in the section A, and to the disconnection state in the sections B and C. The switch control signal In2 is an electric signal exhibiting a low voltage value $V_{2L}$ of 0.0V in the sections A and B, and exhibiting a high voltage value $V_{2H}$ of 3.0 V in the section C. Thus, the switch 123-2 is controlled to the connection state in the sections A and B and to the disconnection state in the section C.

At the beginning of the section A, the output voltage $V_{out}$ is approximately 0.0 V; with passage of time, however, it increases gradually, and attains a voltage of approximately 1.2 V at the end of the section A. This phenomenon shows that, in the section A, the electric current flowing through the induction element 125 increases with passage of time, and that electric charge and electric energy are accumulated in the induction element 125. For, in the section A, there is generated an electric current passing the induction element 125 and the resistor element 121-3 from the power source 107, and electric energy is accumulated in the induction element 125. On the other hand, connection is effected between one end of the induction element 125 and the back surface of the piezoelectric element 105, and the difference in electrical potential between them is eliminated. Further, the voltage applied to both surfaces of the piezoelectric element 105 fluctuates according to the magnitude of the output voltage $V_{out}$, so that the piezoelectric element 105 undergoes deformation in correspondence with the fluctuation.

In the section B, the output voltage $V_{out}$ undergoes change more markedly than in the section A. The output voltage Vout increases abruptly immediately after the beginning of the section B, and decreases after having attained a maximum value of approximately 18.5 V; after having attained a minimum value of approximately −1.6 V, it increases again; and, after having attained a maximum value of approximately 7.2 V, it decreases again. This phenomenon shows that, through the cutting-off of the electric current flowing through the induction element 125, the electric charge and energy accumulated in the induction element 125 moves between it and the piezoelectric element 105 at the resonance frequency $f_0$, whereby the output voltage $V_{out}$ vibrates (oscillates). Further, the piezoelectric element 105 undergoes deformation in response to the fluctuation in the output voltage $V_{out}$.

In this example, the section C begins at the stage where the output voltage $V_{out}$ decreases in the section B. At the beginning of the section C, the output voltage $V_{out}$ is approximately 1.0 V; immediately thereafter, however, it converges to a substantially fixed value of approximately 0.3 V. Thus, the configuration of the piezoelectric element 105 undergoes substantially no change. In the section C, the induction element 125 and the piezoelectric element 105 are separated from each other in order to detect the fluctuation in the output voltage $V_{out}$ in correspondence with the shock transmitted from the case back 104. At this time, an offset voltage is generated in accordance with the amount of electric charge accumulated in the piezoelectric element 105. This offset voltage corresponds to the output voltage $V_{out}$ detected in the state in which no shock is applied to the case back 104 in this section C. The offset voltage varies depending upon the resonance frequency $f_0$ and the timing with which the induction element 125 and the piezoelectric element 105 are separated from each other.

However, when, in the section C, a shock is imparted to the piezoelectric element 105 from the case back 104, there is generated a fluctuation in voltage between the front surface and back surface thereof in accordance with the deformation in correspondence with the shock, and the fluctuation in voltage generated is observed as the output voltage $V_{out}$. As a result, independently of the induced electromotive force generated at both ends of the induction element 125, the shock imparted from the case back 104 is detected based on the output voltage $V_{out}$.

In FIG. 4, the sampling times are indicated by black dots. A sampling time is a point in time when a predetermined period of standby time (e.g., 0.05 msec) has elapsed from the beginning of the section C at the control cycle of each switch. It is only necessary for the standby time to be longer than the time it takes for the output voltage $V_{out}$ to be converged to a fixed value from the beginning of the section C, and to be shorter than the continuation time of the section C. As a result, the influence due to the fluctuation in the output voltage $V_{out}$ is reduced, and sampling is performed on the voltage $V_d$ of a stable subtraction output signal.

While in the example described above with reference to FIG. 4 the continuation time of the section A is shorter than the continuation time of the section B, this should not be construed restrictively.

Figure 5:
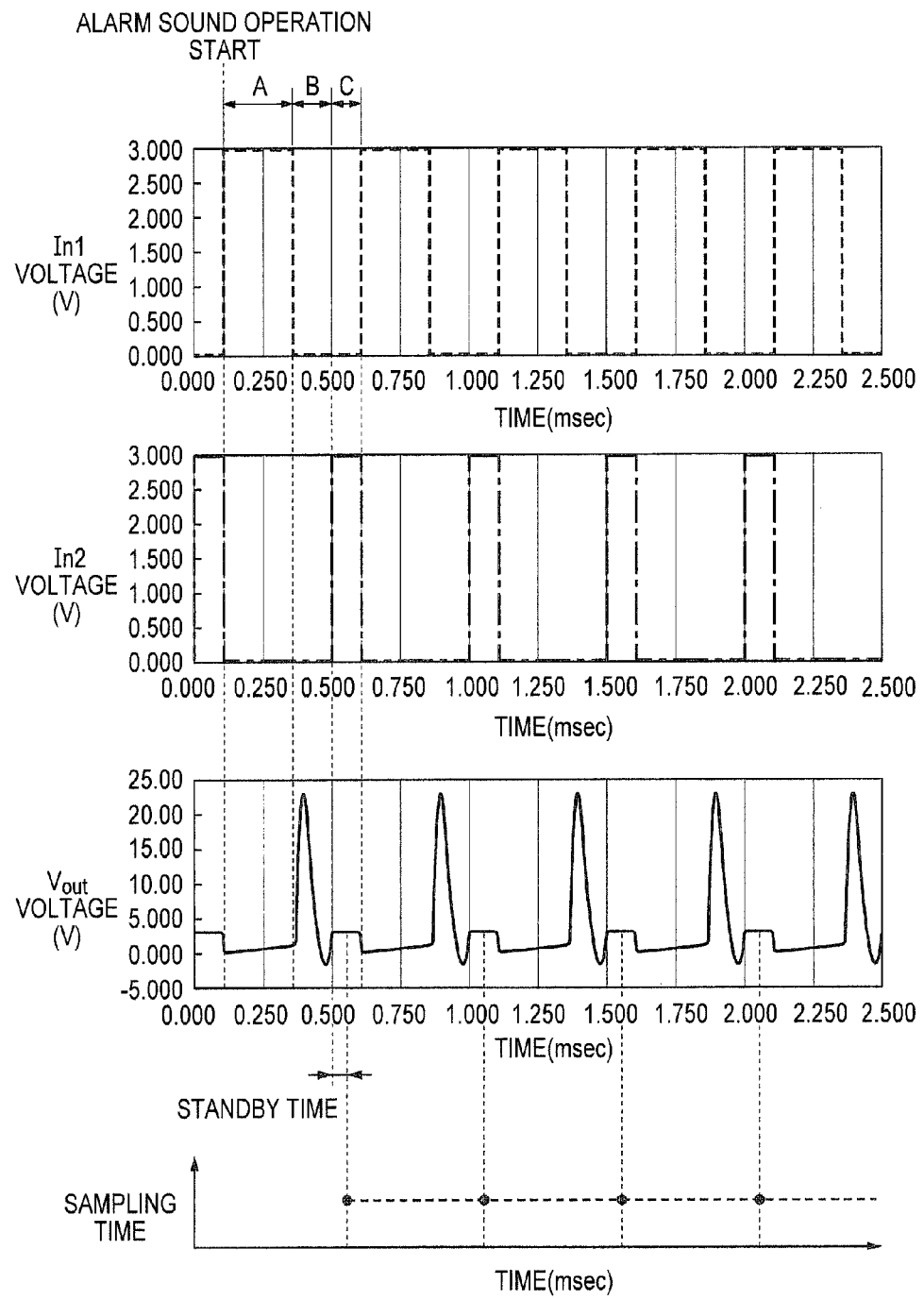
FIG. 5 is a diagram illustrating another example of an output voltage and of a subtraction output signal sampling time.

FIG. 5 is a diagram illustrating another example of the output voltage $V_{out}$ and of the sampling time of the subtraction output signal.

In FIG. 5, the relationship between the signal value, vertical axis, and horizontal axis in each stage is the same as that in FIG. 4.

In the example shown in FIG. 5, the continuation times of the sections A, B, and C are 0.25 msec, 0.15 msec, and 0.1 msec, respectively.

At the beginning of the section A, the output voltage $V_{out}$ is reduced to approximately 0.0 V; with passage of time, however, it increases gradually, attaining a voltage of approximately 1.4 V at the end of the section A. In the section B, the output voltage $V_{out}$ fluctuates more markedly than in the section C or the section A. Immediately after the beginning of the section B, the output voltage $V_{out}$ increases abruptly; and, after attaining a maximum value of approximately 23.0 V, it is reduced, increasing again after attaining a minimum value of approximately −2.1 V. At the stage where the output voltage $V_{out}$ increases, transition is effected from the section B to the section C. On the other hand, in the section C, the output voltage $V_{out}$ maintains a substantially fixed value of approximately 3.0 V. Here, the shock imparted to the case back 104 is detected immediately after the discharge of electric charge from the induction element 125 to the piezoelectric element 105.

While in the examples described with reference to FIGS. 4 and 5 the continuation time of the section C is shorter than the continuation times of the section A and the section B, this should not be construed restrictively. In the present embodiment, the continuation time of the section C may be longer than the continuation times of the section A and of the section B. For example, the continuation times of the sections A, B, and C may be 0.15 msec, 0.1 msec, and 0.25 msec, respectively.

Next, an example of the output voltage $V_{out}$ and the voltage $V_d$ of the subtraction output signal will be described.

Figure 6:
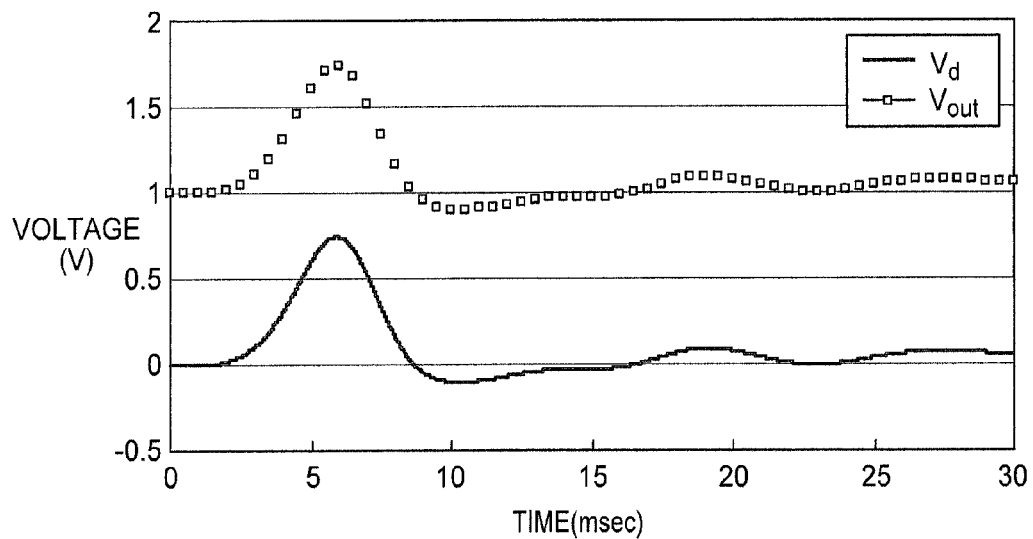
FIG. 6 is a diagram illustrating an example of an output voltage and of the voltage of a subtraction output signal.

FIG. 6 is a diagram illustrating an example of the output voltage $V_{out}$ and the voltage $V_d$ of the subtraction output signal.

In FIG. 6, the horizontal axis indicates time, and the vertical axis indicates voltage. The solid line indicates the voltage $V_d$ of the subtraction output signal, and symbol □ indicates the output voltage $V_{out}$ at each sampling time. The output voltage $V_{out}$ is generally less dependent on time than the voltage $V_d$ of the subtraction output signal; it assumes a high value of approximately 1.0 V, and these two exhibit substantially the same change with passage of time. That is, according to FIG. 6, the offset voltage $V_{th}$ is approximately 1.0 V.

By subtracting the offset voltage $V_{th}$ at the offset subtraction unit 116, it is possible to obtain a subtraction output signal indicating the contribution due to the shock. In FIG. 6, when the time is approximately 5.8 msec, the voltage $V_d$ of the subtraction output signal exhibits a peak value of approximately 0.73 V; however, from the time of 10 msec onward, the voltage $V_d$ of the subtraction output signal exhibits noise components distributed from −0.1 V to 0.1 V. The oscillation frequency of the shock imparted to the case back 104 is mainly distributed in a low frequency region of less than 100 Hz. This frequency region is sufficiently lower than the frequency $2\pi/T_0$ related to the switch control frequency, so that even with a subtraction output signal having undergone sampling, it is sufficiently possible to express the component causing the output voltage $V_{out}$ to fluctuate due to the shock. Further, in the shock detection unit 113, it is also possible to previously determine the detection threshold value voltage to a value larger than the maximum voltage value of the noise component, e.g., 0.3 V, determining that a shock has been imparted when the voltage $V_d$ of the subtraction output signal is larger than that value.

Next, shock detection processing according to the present embodiment will be described. The shock detection processing described below is executed for each switch control cycle.

Figure 7:
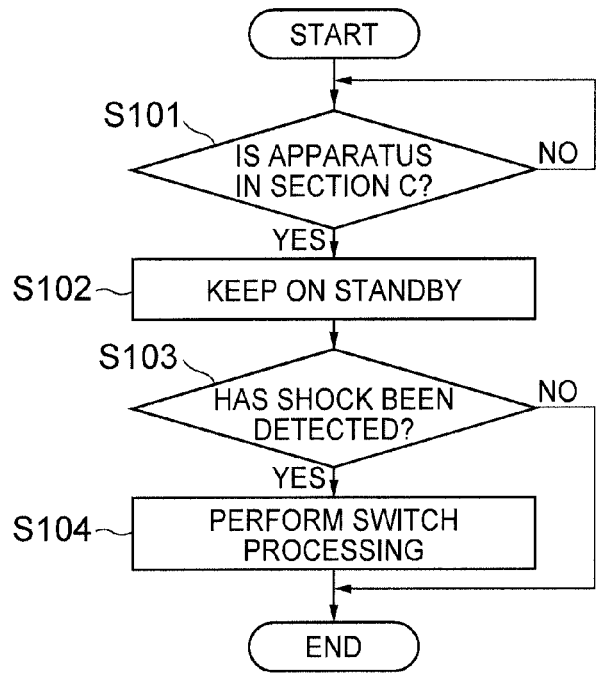
FIG. 7 is a flowchart illustrating shock detection processing according the present embodiment.

FIG. 7 is a flowchart illustrating the shock detection processing according to the present embodiment.

(Step S101) The shock detection unit 113 determines whether the apparatus is in the section C (the state C) based on the voltage values of the switch control signals In1 and In2 input from the switch control unit 112. When it is determined that the apparatus is in the section C (YES in step S101), the procedure advances to step S102. When it is determined that it is not in the section C (NO in step S101), the operation of step S101 is repeated.

(Step S102) When it is determined that the apparatus is in the section C, the shock detection unit 113 is kept on standby for a predetermined standby time. After this, the procedure advances to step S103.

(Step S103) The shock detection unit 113 determines whether or not a shock has been imparted based on the voltage $V_d$ of the subtraction output signal input from the offset subtraction unit 116. When the voltage $V_d$ is larger than the detection threshold value voltage, the shock detection unit 113 determines that a shock has been imparted (shock detection); otherwise, it determines that no shock has been imparted. When it is determined that a shock has been imparted (YES in step S103), the procedure advances to step S104; when it is determined that no shock has been imparted (NO in step S103), the processing is completed.

(Step S104) The shock detection unit 113 generates an alarm sound stop signal, and the generated alarm sound stop signal is output to the switch control unit 112. The alarm sound stop signal is input to the switch control unit 112 from the shock detection unit 113, and the switch control unit 112 stops the output of the switch control signals In1 and In2 (switch processing). As a result, the alarm sound is stopped. After this, the processing is completed.

While in the above-described example the offset subtraction unit 116 is provided in order to compensate for the offset voltage $V_{th}$, this should not be construed restrictively. So long as it is possible to compensate for the offset voltage $V_{th}$, the present embodiment may be equipped with any component, such as an integration circuit.

While in the above-described example the shock detection unit 113 determines that a shock has been imparted when the voltage $V_d$ that has undergone sampling is larger than a predetermined oscillation detection threshold value, this should not be construed restrictively. It is also possible for the shock detection unit 113 to determine that a shock has been imparted when the output voltage $V_{out}$ is larger than the voltage obtained through addition of the detection threshold value voltage and the offset voltage $V_t$, that is, the detection threshold value voltage when the offset voltage $V_t$ is not compensated for. For this purpose, the electronic apparatus 1 may be equipped with a comparator configured to compare the output voltage $V_{out}$ and the detection threshold value voltage with each other. In this case, it is possible to omit the component for compensating for the offset amount such as the offset subtraction unit 116.

As described above, the present embodiment is equipped with an oscillation unit (e.g., the case back 104), a piezoelectric element (e.g., the piezoelectric element 105) configured to impart an oscillation due to deformation in correspondence with an applied voltage to the oscillation unit and to generate a voltage according to deformation due to a shock imparted, and an induction element (e.g., the induction element 125) for applying a boosted voltage to the piezoelectric element. Further, the present embodiment is equipped with a first switch (e.g., the switch 123-1) configured to perform control as to whether or not to supply an electric current from a power source (e.g., the power source 107), a second switch (e.g., the switch 123-2) configured to effect connection or disconnection between the induction element and the piezoelectric element, and a shock detection unit (e.g., the shock detection unit 113) configured to detect a shock imparted to the oscillation unit based on the voltage generated in the piezoelectric element.

The shock detection unit performs control so as not to allow the first switch to supply an electric current to the induction element; and detects the shock imparted to the piezoelectric element based on the voltage generated in the piezoelectric element (e.g., the output voltage $V_{out}$, the voltage $V_d$ of the subtraction output signal when the second switch effects disconnection between the induction element and the piezoelectric element (e.g., in the section C, i.e., the shock detection section). At this time, the detection unit is not affected by the influence of the induced electromotive force generated by the induction element, so that, even when a sound is generated through oscillation of the oscillation unit, it is possible to detect the shock imparted to the oscillation unit with high sensitivity. By extension, it is possible to properly control the operation of the alarm sound or the like in accordance with the detection of the shock.

(Second Embodiment)

Next, the second embodiment of the present invention will be described. The components that are the same as those of the above-described embodiment are indicated by the same reference numerals, and the above description will be referred to.

Figure 8:
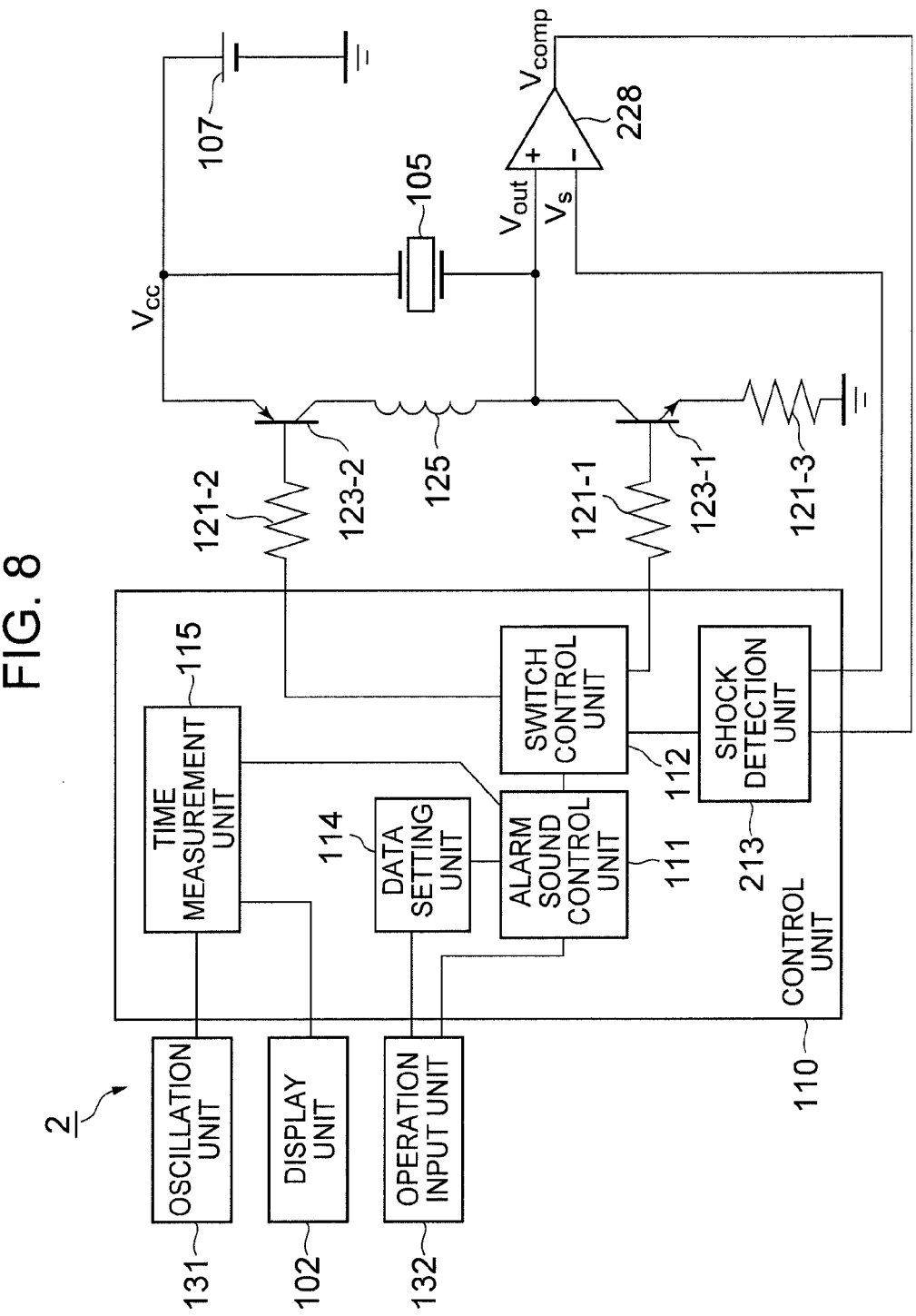
FIG. 8 is a schematic block diagram illustrating the construction of an electronic apparatus according to a second embodiment of the present invention.

FIG. 8 is a schematic block diagram illustrating the construction of an electronic apparatus 2 according to the present embodiment.

The electronic apparatus 2 according to the present embodiment is equipped with the same construction as the electronic apparatus 1 (FIG. 3). However, the electronic apparatus 2 is equipped with a shock detection unit 213 instead of the shock detection unit 113 (FIG. 3), and is equipped with a comparator 228 instead of the offset subtraction unit 116.

The comparator 228 is equipped with a non-reverse input end, a reverse input end, and an output end. The non-reverse input end of the comparator 228 is connected to the front surface of the piezoelectric element 105, the other end of the induction element 125, and one end of the switch 123-1. Input to the reverse input end of the comparator 228 from the shock detection unit 213 is a detection signal having a voltage (detection threshold value voltage) $V_s$. The comparator 228 determines whether or not the output voltage $V_{out}$ at the non-reverse input end is larger than the detection threshold value voltage $V_s$ in the reverse input end, and generates a detection signal showing whether the output voltage $V_{out}$ is larger than the detection threshold value voltage $V_s$ or not. For example, the signal value $V_{comp}$ of the detection signal is 1 when the output voltage $V_{out}$ is larger than the detection threshold value voltage $V_s$, and is 0 when the output voltage $V_{out}$ is equal to or smaller than the detection threshold value voltage $V_s$. The comparator 228 outputs the generated detection signal to the shock detection unit 213.

The shock detection unit 213 performs processing similar to that of the shock detection unit 113. Further, the shock detection unit 213 performs the following processing. The shock detection unit 213 controls the switches 123-1 and 123-2 to the condition C when the switch control signals In1 and In2 input from the switch control unit 112 indicate the condition B, and when the output voltage $V_{out}$ at the front surface of the piezoelectric element 105, at the other end of the induction element 125, and at the switch 123-1 has exceeded the threshold value V1 of a predetermined voltage. When the output voltage $V_{out}$ has exceeded the threshold value V1, it means the threshold value has been placed from a state in which it is lower than the threshold value V1 to a state in which it is higher than that. Such a phenomenon is generated when, in the state B, the induced electromotive force generated at both ends of the induction element 125 is discharged to generate a voltage applied to both surfaces of the piezoelectric elements 105 at both ends of the induction element 125, and the generated voltage is applied to both surfaces of the piezoelectric element 105 again.

To control the switches 123-1 and 123-2 to the state C, the shock detection unit 213 generates, for example, a timing control signal instructing the update of the state B indicated by the switch control signals In1 and In2 to the state C. More specifically, the timing control signal is a signal instructing a change of the voltage value of the switch control signal In2 to be changed from a low voltage value $V_{2L}$ to a high voltage value $V_{2H}$. The shock detection unit 213 outputs the generated timing control signal to the switch control unit 112. And, in response to the input of the timing control signal from the shock detection unit 213, the switch control unit 112 changes the voltage value of the switch control signal In2 from the low voltage value $V_{2L}$ to the high voltage value $V_{2H}$. As a result, the state B indicated by the switch control signals In1 and In2 is updated to the state C.

In order to detect that the output voltage $V_{out}$ has exceeded the threshold value V1, the shock detection unit 213 generates a detection signal having the threshold value V1 as the detection threshold value voltage $V_s$ when the input switch control signals In1 and In2 indicated the state B. The shock detection unit 213 outputs the generated detection signal to the comparator 228. The shock detection unit 213 detects that the signal value $V_{comp}$ of the detection signal input from the comparator 228 has been changed from 1 to 0 and then again to 1, whereby it determines that the output voltage $V_{out}$ has exceeded the threshold value V1.

After determining that the output voltage $V_{out}$ has exceeded the threshold value V1, the shock detection unit 213 may change the detection threshold value voltage $V_s$ to the threshold value V2 apart from controlling the switches 123-1 and 123-2 to the state C. The threshold value V2 is previously set so as to be a signal value obtained through addition of the detection threshold value voltage used when detecting that a shock has been imparted and the offset voltage $V_{th}$, that is, a detection threshold value voltage in which the offset voltage $V_{th}$ has not been compensated for. The shock detection unit 213 detects whether the signal value $V_{comp}$ input from the comparator 228 in the section C is 1 or not, and may determine that a shock has been imparted when the signal value $V_{comp}$ is 1. The shock detection unit 213 may, for example, be at a time when a predetermined standby time has elapsed from the beginning time of the section C.

As a result, the continuation time of the section B may not be maintained fixed and may fluctuate; however, since the offset voltage $V_{th}$ is controlled to a fixed value, it is possible to stabilize the system, and to achieve an improvement in terms of sensitivity to shock. Here, the switch control cycle and the continuation time of the section A may be maintained at fixed values.

In the section A, the shock detection unit 213 may set the detection threshold value voltage $V_s$ to an arbitrary voltage value, e.g., either of the threshold values V1 and V2.

Next, an example of the switch control signals In1 and In2, the output voltage $V_{out}$, the signal value $V_{comp}$ of the detection signal, and the detection threshold value voltage $V_s$ will be described.

Figure 9:
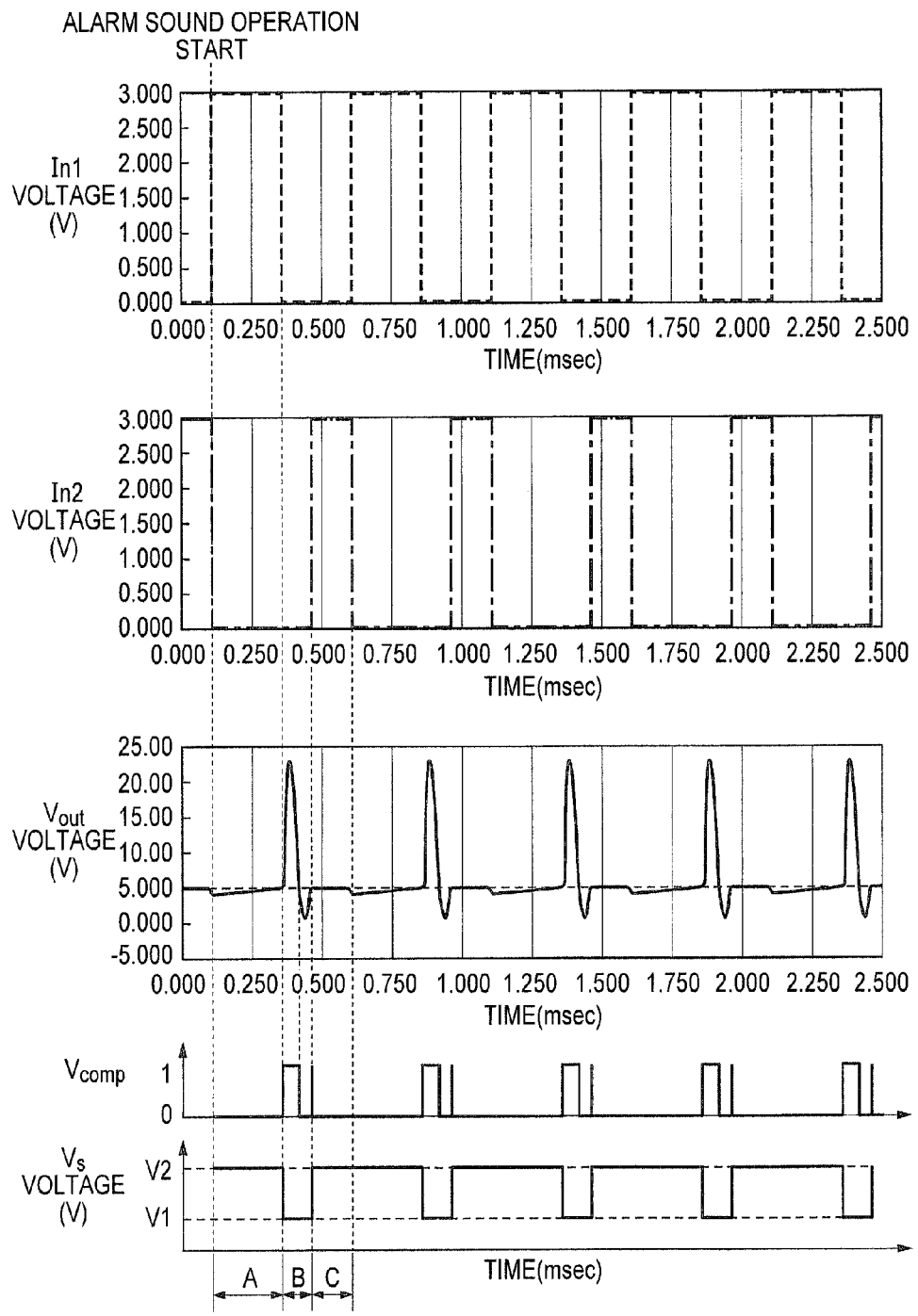
FIG. 9 is a diagram showing an example of an output voltage, the signal value of a detection signal, and detection threshold value voltage.

FIG. 9 is a diagram illustrating an example of the output voltage $V_{out}$, the signal value $V_{comp}$ of the detection signal, and the detection threshold value voltage $V_s$.

In FIG. 9, the horizontal axis in each stage indicates time. The vertical axes of the uppermost to the lower most stages respectively indicate the voltage of the switch control signal In1, the voltage of the switch control signal In2, the output voltage $V_{out}$, the signal value $V_{comp}$ of the detection signal, and the detection threshold value voltage $V_s$.

In FIG. 9, the sections indicated by the arrows and symbols A, B, and C are the sections A, B, and C in the switch control cycle from the 0.1 msec to 0.6 msec shown below the lowermost stage. In the example shown in FIG. 9, the switch control cycle is 0.5 msec, which is repeated, using the alarm sound start time of 0.1 msec as the starting point. The continuation time of the section A is 0.25 msec.

The dashed line of the third stage directed in the horizontal direction is a line indicating the voltage V1. It is shown in the lowermost stage that, in the section A and the section C, the detection threshold value voltage $V_s$ is V2, and that, in the section B, the detection threshold value voltage $V_s$ is V1. In the third and fourth stages, immediately after starting the section B, when the output voltage $V_{out}$ exceeds V1, which is the detection threshold value voltage $V_s$, the signal value $V_{comp}$ changes from 0 to 1; thereafter, when the output voltage $V_{out}$ becomes lower than V1, the signal value $V_{comp}$ changes from 1 to 0. And, when the output voltage $V_{out}$ exceeds V1 again, the signal value $V_{comp}$ changes from 0 to 1, and transition is effected from the section B to the section C; thereafter, the signal value $V_{comp}$ remains 0 until the section C and the section A are completed, and the section B begins. In this way, in the present embodiment, the start of the section C is determined according to the change in the output voltage $V_{out}$ and, by extension, the timing with which the shock is detected is determined.

Next, the shock detection processing according to the present embodiment will be described. This shock detection processing is executed with respect to each switch control cycle. In this example, the switch control signals In1 and In2 indicate the state A at first; however, this should not be construed restrictively. The switch control signals In1 and In2 may indicate some other stage at first, e.g., the state B and the state C.

Figure 10:
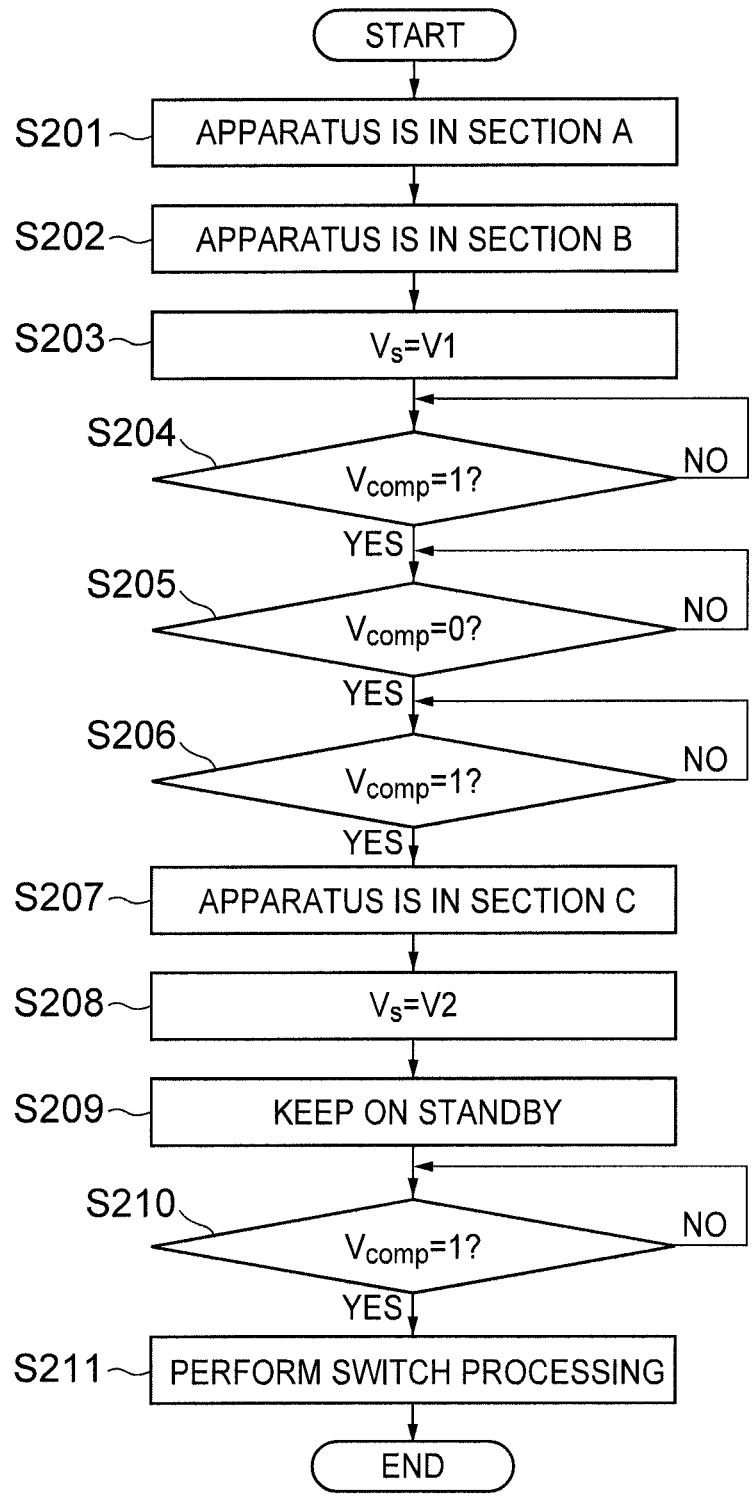
FIG. 10 is a flowchart illustrating shock detection processing according to the present embodiment.

FIG. 10 is a flowchart illustrating the shock detection processing according to the present embodiment.

(Step S201) The shock detection unit 213 determines that the apparatus is at present in the section A (the state A) based on the voltage values of the switch control signals In1 and In2 input from the switch control unit 112. After the predetermined period of time during which the switch control signals In1 and In2 indicates the state A, the procedure advances to step S202.

(Step S202) The shock detection unit 213 determines that the apparatus is at present in the section B (the state B) based on the voltage values of the switch control signals In1 and In2 input from the switch control unit 112. After this, the procedure advances to step S203.

(Step S203) The shock detection unit 213 determines the detection threshold value voltage $V_s$ as the threshold value V1, and generates a detection signal exhibiting the threshold value V1 as the voltage. The shock detection unit 213 outputs the generated detection signal to the reverse input end of the comparator 228. After this, the procedure advances to step S204.

(Step S204) The shock detection unit 213 determines whether or not the signal value $V_{comp}$ of the detection signal input from the comparator 228 is 1. As a result, it is determined whether the output voltage $V_{out}$ is higher than the threshold value V1. When it is determined that the signal value $V_{comp}$ is 1 (i.e., YES in step S204), the procedure advances to step S205. When it is determined that the signal value $V_{comp}$ is not 1 (i.e., NO in step S204), the operation of step S204 is repeated.

(Step S205) The shock detection unit 213 determines whether or not the signal value $V_{comp}$ of the detection signal input from the comparator 228 is 0. As a result, it is determined whether or not the output voltage $V_{out}$ is equal to or lower than the threshold value V1. When it is determined that the signal value $V_{comp}$ is 0 (i.e., YES in step S205), the procedure advances to step S206. When it is determined that the signal value $V_{comp}$ is not 0 (i.e., NO in step S205), the operation of step S205 is repeated.

(Step S206) The shock detection unit 213 determines whether or not the signal value $V_{comp}$ of the detection signal input from the comparator 228 is 1. When it is determined that the signal value $V_{comp}$ is 1 (i.e., YES in step S206), the procedure advances to step S207. As a result, it is determined that the output voltage $V_{out}$ has exceeded the threshold value V1. When it is determined that the signal value $V_{comp}$ is not (i.e., NO in step S206), the operation of step S206 is repeated.

(Step S207) The shock detection unit 213 controls the switches 123-1 and 123-2 to the state C, thereby starting the section C. Here, the shock detection unit 213 generates a timing control signal, and outputs the generated timing control signal to the switch control unit 112. The switch control unit 112 updates the state B indicated by the switch control signals In1 and In2 to the state C, and outputs the switch control signals In1 and In2 indicating the state C respectively to the switches 123-1 and 123-2. After this, the procedure advances to step S208.

(Step S208) The shock detection unit 213 determines the detection threshold value voltage $V_s$ as the threshold value V2, and generates a detection signal exhibiting the threshold value V2 as the voltage. The shock detection unit 213 outputs the generated detection signal to the reverse input end of the comparator 228. After this, the procedure advances to step S209.

(Step S209) After starting the state C, the shock detection unit 213 is kept on standby for a predetermined standby time. After this, the procedure advances to step S210.

(Step 3210) The shock detection unit 213 determines whether or not the signal value $V_{comp}$ of the detection signal input from the comparator 228 is 1. When it is determined that the signal value $V_{comp}$ is 1 (i.e., YES in step S210), the procedure advances to step S211. As a result, it is determined that the output voltage $V_{out}$ has exceeded the threshold value V2, so that it is determined that a shock has been imparted (shock detection). When it is determined that the signal value $V_{comp}$ is not 1 (i.e., NO in step S210), the operation of step S210 is repeated.

(Step S211) The shock detection unit 213 generates an alarm sound stop signal, and outputs the generated alarm sound stop signal to the switch control unit 112. The alarm sound stop signal is input to the switch control unit 112 from the shock detection unit 213, and the switch control unit 112 stops the output of the switch control signals In1 and In2 (switch processing). As a result, the alarm sound is stopped. After this, the processing is completed.

As described above, in the present embodiment, after the supply of an electric current from a power source (e.g., the power source 107) to an induction element (e.g., the induction element 125) is stopped, a control unit (e.g., the control unit 101) performs control as to whether or not a second switch (e.g., the switch 123-2) should disconnect between the induction element and a piezoelectric element based on the voltage (e.g., the signal value $V_{comp}$, the output voltage $V_{out}$) generated in the piezoelectric element (e.g., the piezoelectric element 105). Thus, it is possible to stabilize the amount of DC component contained in the signal value (e.g., the offset voltage $V_{th}$) so that it is possible to detect with high sensitivity a shock imparted to an oscillation unit (e.g., the case back 104).

(Third Embodiment)

Next, the third embodiment of the present invention will be described. The components that are the same as those of the above-described embodiments are indicated by the same reference numerals, and the above description will be referred to.

Figure 11:
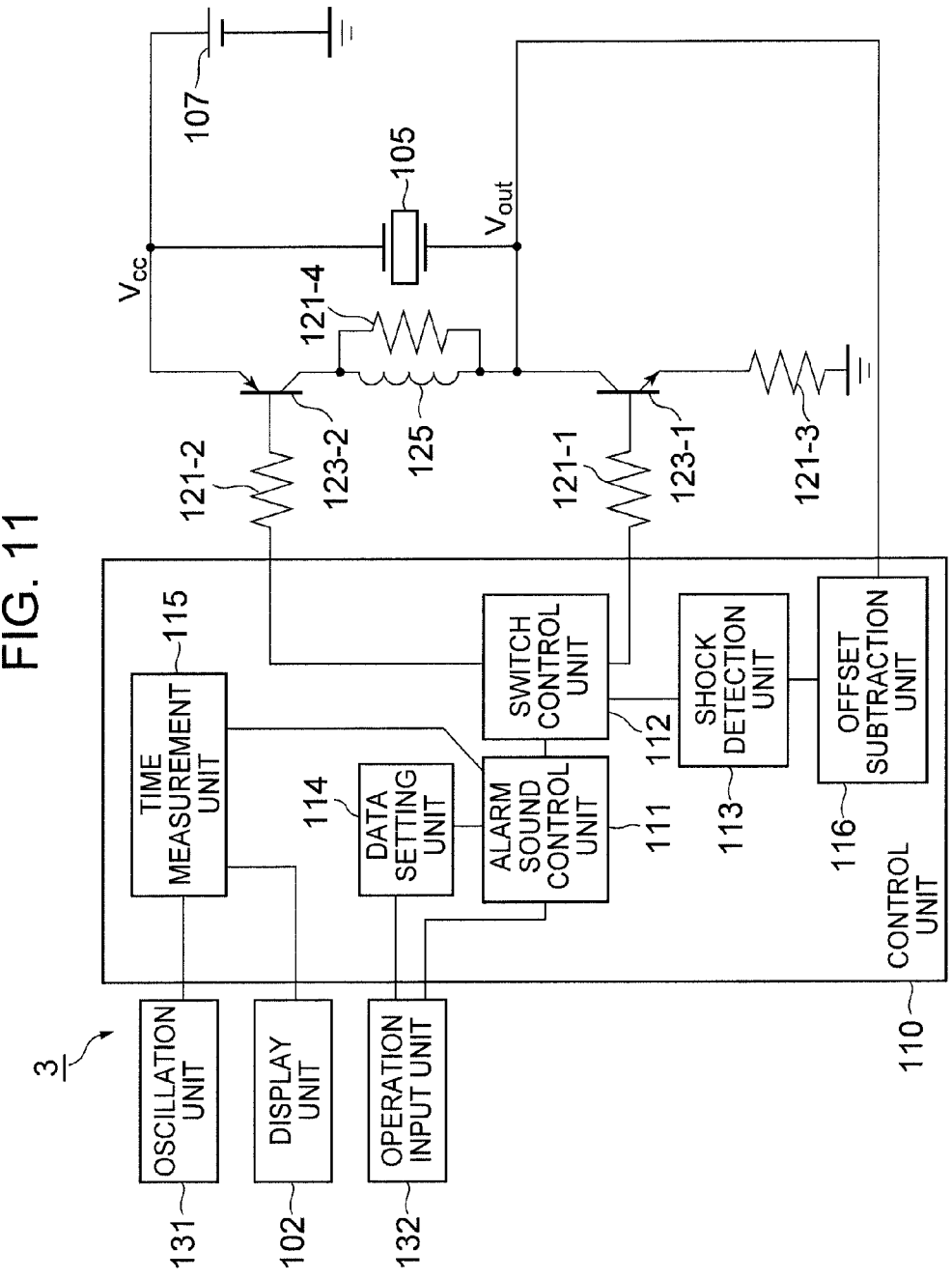
FIG. 11 is a schematic block diagram illustrating the construction of an electronic apparatus according to a third embodiment of the present invention.

FIG. 11 is a schematic block diagram illustrating the construction of an electronic apparatus 3 according to the present embodiment.

The electronic apparatus 3 according to the present embodiment is provided with the same construction as that of the electronic apparatus 1 (FIG. 3). However, in the electronic apparatus 3, a resistor element 121-4 and the induction element 125 are provided in parallel in the electronic apparatus 1 (FIG. 3).

One end of the resistor element 121-4 is connected to one end of the induction element 125, and the other end of the resistor element 121-4 is connected to the other end of the induction element 125. The resistance value $R_4$ of the resistor element 121-4 is selected so as to be sufficiently larger than the absolute value $\omega_0 L$ of the impedance of the induction element 125, and the absolute value $1/(\omega_0 C_c)$ of the impedance of the piezoelectric element 105. Immediately after the transition from the state B, in which the induced electromotive force is generated at both ends of the resistor element 121-4, to the state C, that is immediately after the transition from the connection state to the disconnection state of the switch 123-2, the resistor element 121-4 is connected, whereby any electrical energy remaining in the induction element 125 is consumed at the resistor element 121-4. Next, when the apparatus is placed in the state A, and the induction element 125 is connected to the resistor element 121-3, an abrupt increase in electric current is avoided, so that it is possible to secure safety.

In the present embodiment, the electronic apparatus 3 may be constructed such that the resistor element 121-4 is provided in parallel with the induction element 125 in the electronic apparatus 2 (FIG. 8).

In this way, in the present embodiment, the resistor element (e.g., the resistor element 121-4) is connected in parallel with the induction element (e.g., the induction element 125) applying a voltage to the piezoelectric element (e.g., the piezoelectric element 105). Thus, immediately after the transition from the connection state to the disconnection state of the induction element and the piezoelectric element, the energy generated in the induction element is consumed, so that it is possible to secure safety.

(Fourth Embodiment)

Next, the fourth embodiment of the present invention will be described. The components that are the same as those of the above-described embodiments are indicated by the same reference numerals, and the above description applies thereto.

Figure 12:
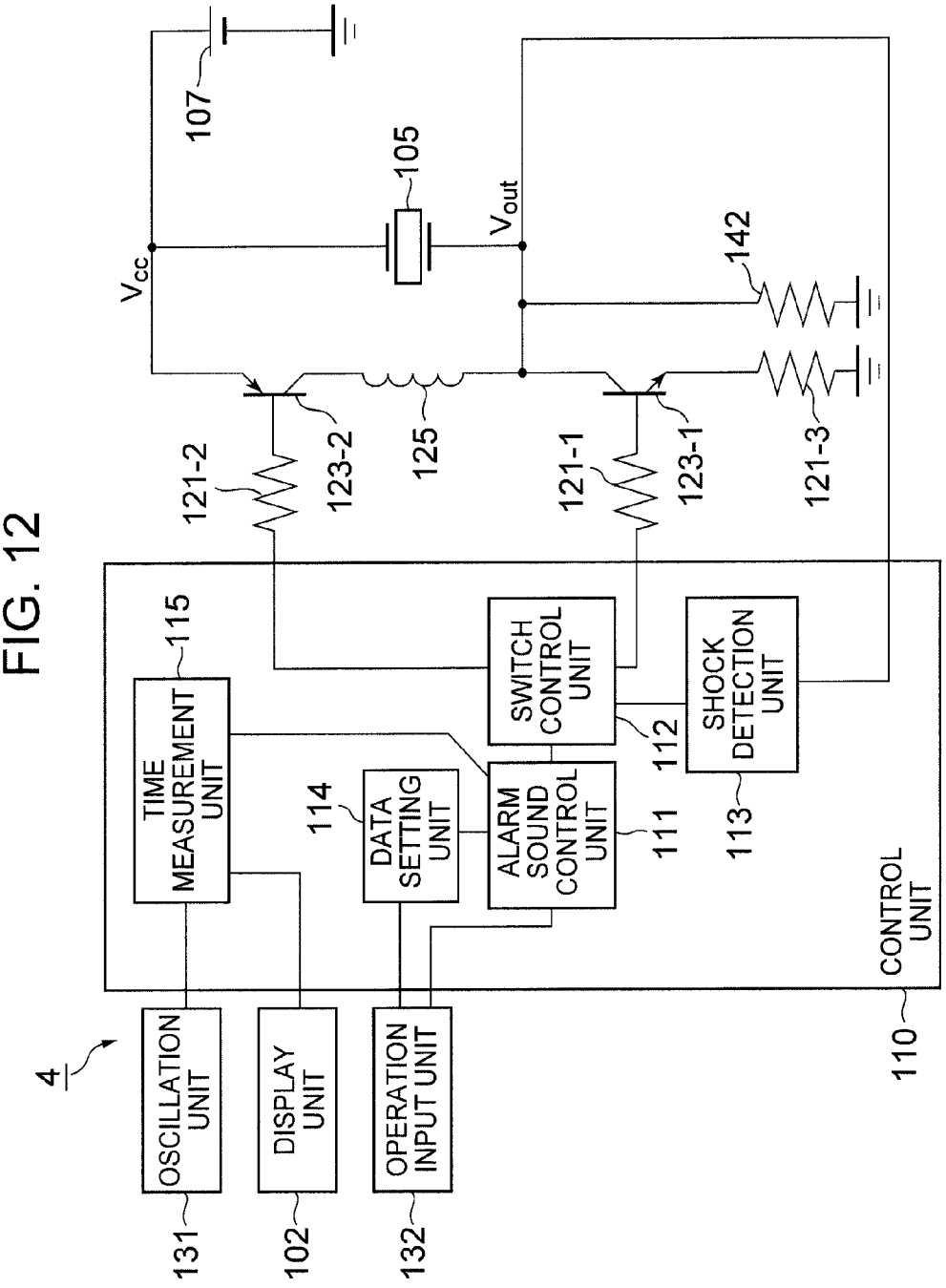
FIG. 12 is a schematic block diagram illustrating the construction of an electronic apparatus according to a fourth embodiment of the present invention.

FIG. 12 is a schematic block diagram illustrating the construction of an electronic apparatus 4 according to the present embodiment.

In the electronic embodiment 4 according to the present embodiment, a resistor element 142 is further provided in the electronic apparatus 1 (FIG. 3). In the electronic apparatus 4, the offset subtraction unit 116 (FIG. 3) may be omitted.

The resistor element 142 is a resistor element exhibiting a predetermined electrical resistance value $R_6$. The resistor element 142 is in parallel with the switch 123-1 and the resistor element 121-3, and is connected in series with piezoelectric element 105. More specifically, one end of the resistor element 142 is connected to the other end of the induction element 125, one end of the switch 123-1, and a collision detection unit 113. The other end of the resistor element 142-3 is grounded. The electrical resistance value $R_6$ is previously set such that the time constant obtained by multiplying this electrical resistance value $R_6$ by the capacitance $C_c$ of the piezoelectric element 105 is sufficiently longer than the electromotive voltage generated by tap operation, that is, the duration time of the output voltage $V_{out}$. For example, when the duration time of the output voltage $V_{out}$ is several msec to ten and several msec, the electrical resistance value $R_6$ is set such that the product of the time constant $R_6$ and $C_c$ is of a value of not more than 100 msec. In this construction, the electric charge accumulated in the piezoelectric element 105 is discharged, so that it is possible to reduce or eliminate the offset voltage $V_{th}$ generated through the accumulation of electric charge.

Next, an example of the shock detection will be described. In the following description, comparison will be made between the electronic apparatus 4 equipped with the resistor element 142 and the electronic apparatus 1 (FIG. 3) equipped with no resistor element 142 in terms of the output voltage $V_{out}$ generated through tap operation when the switch 123-2 is in the disconnection state (OFF), the voltage $V_d$ of the subtraction output signal, and the detection voltage $V_e$.

Figure 13A:
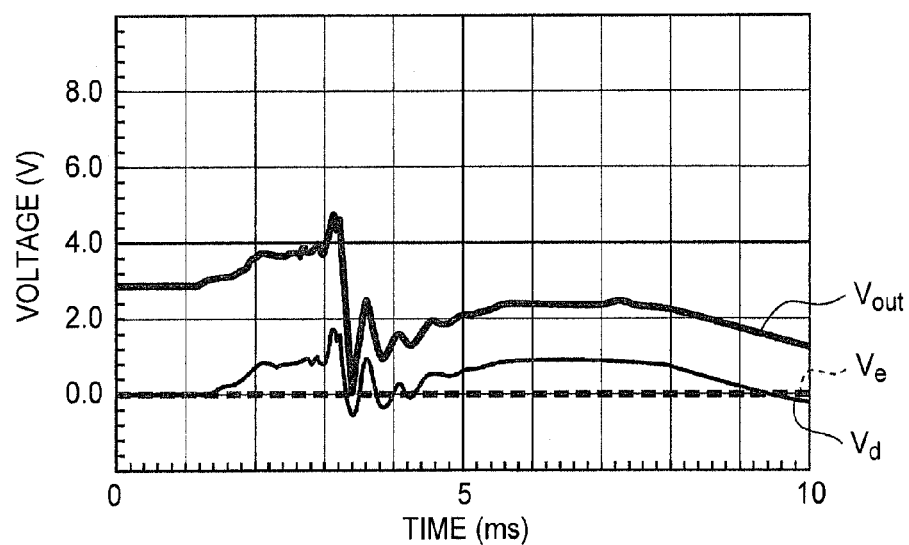
FIG. 13A is a diagram illustrating an example of shock detection by the electronic apparatus illustrated in FIG. 3.
Figure 13B:
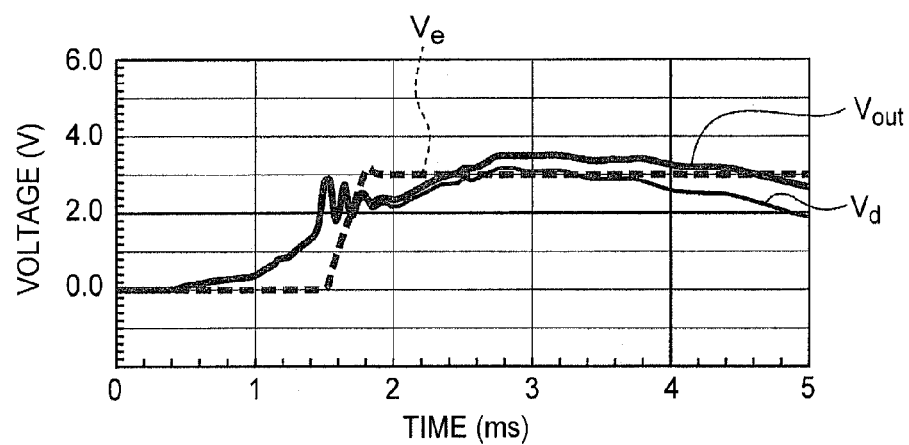
FIG. 13B is a diagram illustrating an example of shock detection by the electronic apparatus illustrated in FIG. 12.

FIGS. 13A and 13B are diagrams illustrating an example of the shock detection. The vertical axis and the horizontal axis respectively indicate voltage and time.

FIG. 13A illustrates an example of the output voltage $V_{out}$ detected by the electronic apparatus 1, the voltage $V_d$ of the subtraction output signal, and the detection voltage $V_e$.

In this example, the output voltage $V_{out}$ is approximately 3 V at first; however, it is abruptly reduced when the output voltage $V_{out}$ exceeds the reverse breakdown voltage of the switch 123-2 (which, in this example, is approximately 4 V) through tap operation. This phenomenon is due to the fact that the switch 123-2 is placed in the connection state (ON) as a result of the output voltage $V_{out}$ exceeding the reverse breakdown voltage of the switch 123-2. After this, the output voltage $V_{out}$ fluctuates between 0 and 2.2 V.

The voltage $V_d$ of the subtraction output voltage is 0 V at first; and, with the abrupt reduction in the output voltage $V_{out}$, the voltage $V_d$ of the subtraction output signal is also reduced. After this, the voltage $V_d$ of the subtraction output signal fluctuates between −0.3 and 0.9 V; however, the difference between it and the output voltage $V_{out}$ is maintained at approximately 2.0 V.

The detection voltage $V_e$ is maintained substantially at 0 V. This indicates the fact that no shock has been detected since the voltage $V_d$ of the subtraction output signal does not exceed a predetermined detection threshold value voltage.

FIG. 13B illustrates an example of the output voltage $V_{out}$ detected by the electronic apparatus 4 according to the embodiment, the voltage $V_d$ of the subtraction output signal, and the detection voltage $V_e$.

In this example, the output voltage $V_{out}$ is approximately 0 V at first; however, the output voltage $V_{out}$ increases through tap operation, with its peak value being approximately 3 V. After this, the output voltage $V_{out}$ fluctuates between 2.0 and 3.5 V. The output voltage $V_{out}$ does not exceed the reverse breakdown voltage of the switch 123-2, so that the condition of the switch 123-2 is maintained in the disconnection state (OFF).

The voltage $V_d$ of the subtraction output signal is 0 V at first; and it further approximates the output voltage $V_{out}$ than in the example shown in FIG. 13A. Although the difference between it and the output voltage $V_{out}$ tends to increase with passage of time, it does not exceed 1.0 V. This indicates that the accumulation of electric charge in the piezoelectric element 105 is suppressed.

The detection voltage $V_e$ is 0 V at first (which means no shock has been detected); however, it increases to 3.0 V (which means a shock has been detected) after the voltage $V_d$ of the subtraction output signal exceeds approximately 2.0 V. This indicates the fact that the tap operation performed at time 1.5 msec has been correctly detected through the suppression of electric charge accumulated in the piezoelectric element 105.

As described above, in the present embodiment, one end of the resistor element 142-1 is connected to the front surface of the piezoelectric element 105, and one end of the resistor element 142-1 is grounded, so that the electric charge accumulated in the piezoelectric element 105 is discharged. Thus, it is possible to reduce or eliminate the offset voltage $V_{th}$ generated through the accumulation of electric charge, so that it is possible for the shock detection unit 113 to reliably detect the shock imparted to the back surface of the piezoelectric element 105 based on the output voltage $V_{out}$.

(Fifth Embodiment)

Next, the fifth embodiment of the present invention will be described. The components that are the same as those of the above-described embodiments are indicated by the same reference numerals, and the above descriptions are applicable thereto.

An electronic apparatus 5 according to the present embodiment is of the same hardware construction as the electronic apparatus 1 (FIG. 3). However, in a section C' different from the sections A, B, and C, the switch control unit 112 generates a switch control signal In1 exhibiting a high voltage value $V_{1H}$ of 3.0V, and a switch control signal In2 exhibiting a high voltage value $V_{2H}$ of 3.0 V. In the section C', the switches 123-1 and 123-2 are respectively controlled to the connection state (ON) and the disconnection state (OFF). In the following description, the state in which the switches 123-1 and 123-2 are respectively in the connection state (ON) and the disconnection state (OFF) will be referred to as the state C'.

Here, the switch control unit 112 starts the section C' after the completion of the section B, and starts the section C immediately after the completion of the section C'. It is only necessary for the continuation time of the section C' to be larger than a period of time in which the electric charge accumulated on the surface of the piezoelectric element 105 is sufficiently removed, e.g., the product of $C_c$ and $R_7$.

Further, before the beginning of the section C', the sections A and B may be alternately repeated. Through the repetition of the sections A and B, a voltage fluctuating at the repetition cycle is applied to the piezoelectric element 105. Through the fluctuation of the voltage applied to the piezoelectric element 105, the case back 104 oscillates, thereby issuing an alarm sound. The electronic apparatus 5 may be equipped with a resistor element 142 like the electronic apparatus 4 (FIG. 12).

Next, an example of the conditions of the switches 123-1 and 123-2 due to the switch control signals In1 and In2 will be described.

Figures 14, 15:
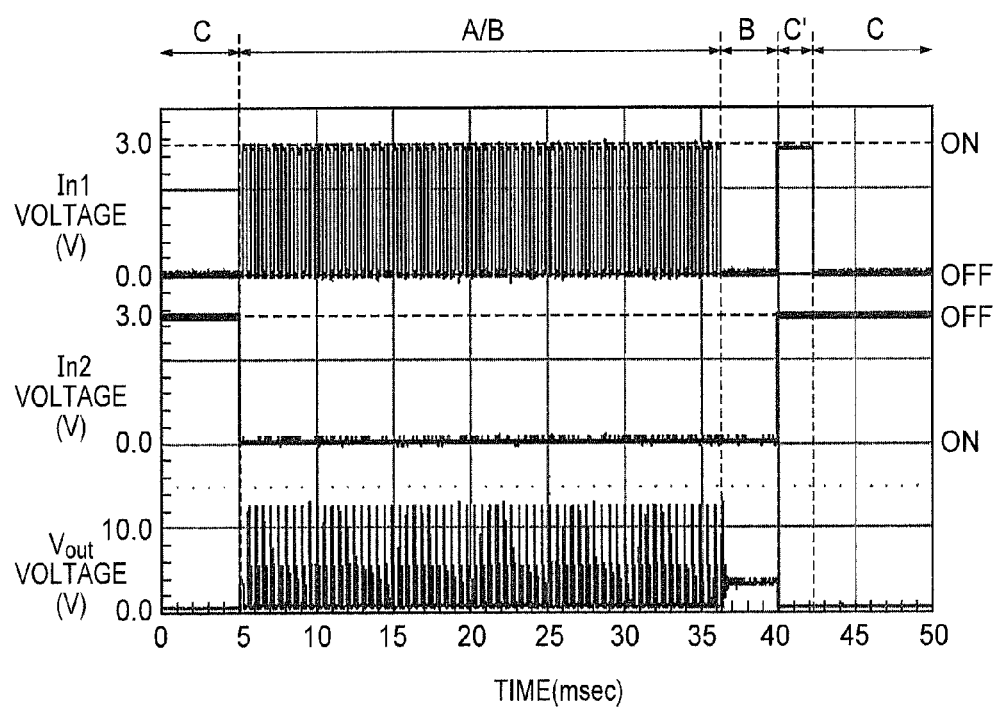
FIG. 14 is a table showing the condition of a switch for each section due to a switch control signal according to a fifth embodiment of the present invention.
FIG. 15 is a diagram illustrating an example of switch control.

FIG. 14 is a table illustrating the conditions of the switches 123-1 and 123-2 for each section due to the switch control signals In1 and In2 according to the present embodiment.

In the section A, the switches 123-1 and 123-2 are both controlled to the connection state (ON) (state A). In the section B, the switches 123-1 and 123-2 are respectively controlled to the disconnection state (OFF) and the connection state (ON) (state B). In the section C', the switches 123-1 and 123-2 are respectively controlled to the connection state (ON) and the disconnection state (OFF) (state C'). In the section C, the switches 123-1 and 123-2 are both controlled to the disconnection state (OFF) (state C).

In the section C', the switch 123-1 is controlled to the connection state (ON), and the switch 123-2 is controlled to the disconnection state (OFF), whereby the supply of electric current to the induction element 125 is hindered, whereas the electric charge accumulated on the front surface of the piezoelectric element 105 is removed via the switch 123-1 and the resistor element 121-3. In the section C begun after this, it is possible for the shock detection unit 113 to reliably detect the shock based on the output voltage $V_{out}$.

Next, a control example of the switches 123-1 and 123-2 will be described.

FIG. 15 is a diagram illustrating a control example of the switches 123-1 and 123-2.

The vertical axis and the horizontal axis respectively indicate voltage and time. In FIG. 15, the switch control signal In1 is shown in the uppermost stage, the switch control signal In2 is shown in the second stage, and the output voltage $V_{out}$ is shown in the third stage.

In this example, the time 0 to 5 ms is the section C; and, between the time 5 and 36 ms, the sections A and B are alternately repeated at a cycle of 1 ms. The section between the times 36 and 40 ms is the section B, the section between the times 40 ms and 42 ms is the section C', and the section between the times 42 and 50 ms is the section C. Between the times 5 and 36 ms, the sections A and B are alternately repeated, whereby an alarm sound is issued by the case back 104, and the output voltage $V_{out}$ fluctuates between 0.0 V and 12.5 V at this repetition cycle. Thereafter, in the section B, the fluctuation in the output voltage $V_{out}$ is reduced, and the output voltage $V_{out}$ is maintained at 3.0 V. This voltage value of 3.0 V corresponds to the power source voltage $V_{cc}$. In the section C' after this, the output voltage $V_{out}$ is reduced from 3.0 V to 0.0 V; even after the start of the section C thereafter, the output voltage $V_{out}$ is maintained at 0.0 V.

As described above, in the present embodiment, before the beginning of the section C, in which the switches 123-1 and 123-2 are both controlled to the disconnection state (OFF), there is provided the section C', in which the switches 123-1 and 123-2 are respectively controlled to the connection state (ON) and the disconnection state (OFF). As a result, the electric charge accumulated on the front surface of the piezoelectric element 105 is removed, so that it is possible to reliably detect the shock in the section C based on the output voltage $V_{out}$.

While in the above-described example the switches 123-1 and 123-2 are transistors, this should not be construed restrictively. So long as it is possible to switch between electrical connection and disconnection between one end and the other end of each of them, the switches 123-1 and 123-2 may be of any type of switches, e.g., electromagnetic switches or diode switches.

The capacitance $C_c$ of the piezoelectric element 105 and the inductance L of the induction element 125 may be equal to the resonance frequency $f_0$ due to them and the resonance frequency $f_s$ (e.g., 2 to 5 kHz) of the case back or within a predetermined range from the resonance frequency $f_s$. When the piezoelectric element 105 is deformed at this frequency, the case back 104 oscillates greatly, so that it is possible to achieve an improvement in terms of energy efficiency for the alarm sound.

On the other hand, as stated above, regarding the electromotive voltage of the piezoelectric element 105 generated through tap operation or the like, a low range component of 200 Hz or less is predominant. Thus, conventionally, it has been impossible to obtain a sufficient output voltage $V_{out}$ since the impedance of the induction element 125 is low. In contrast, in the above-described embodiment, there is provided the section C controlling both the switches 123-1 and 123-2 to the disconnection state (OFF), whereby electrical disconnection is effected between the piezoelectric element 105 and the induction element 125, so that it is possible to obtain a sufficient output voltage $V_{out}$ by the shock. In the section C, the shock detection unit 113 can reliably detect the shock based on the output voltage $V_{out}$.

While in the above-described examples the electronic apparatuses 1 through 5 are wristwatches, this should not be construed restrictively. In the above-described embodiments, the electronic apparatuses 1 through 5 may be electronic timepieces other than wristwatches, such as clocks. Further, in the present embodiment, the electronic apparatuses 1 through 5 are not restricted to electronic timepieces other than wristwatches; for example, they may also be telephones such as mobile phones (inclusive of so-called smart phones) or tablet terminal devices. When the electronic apparatuses 1 through 5 are telephones, the above-described embodiments may be carried out, for example, in a mode in which a given shock is detected when the alarm sound mechanism for generating a ringer tone or the like generates a sound. The above-described embodiments may be carried out, for example, in a mode in which a given shock is detected when an oscillation mechanism for generating an oscillation at the time of reception generates the oscillation. In these modes, it is possible to stop the operation of sound generation, oscillation or the like in response to the detection of a shock.

A part of the electronic apparatuses 1 through 5 of the above-described embodiments, e.g., the alarm sound control unit 111, the switch control unit 112, the shock detection unit 113, 213, the data setting unit 114, the time measurement unit 115, and the offset subtraction unit 116, may be realized, by means of a computer. Further, in addition to the above construction, it is also possible to realize the function of the comparator 228 by the computer. In this case, it is also possible to record a program for realizing this control function in a recording medium allowing reading by a computer, and to load the program recorded in this recording medium to a computer system to cause it to execute the same, thereby realizing this control function. Here, the term "computer system" implies a computer system contained in the electronic apparatuses 1 through 5, and it includes an operating system (OS) and hardware such as a peripheral apparatus. The "computer system" may consist of a single component such as a central processing unit (CPU) or a computer system (inclusive of a microcomputer) equipped with such a component. Further, "the medium allowing reading by a computer" refers to a portable medium, such as a flexible disk, a magneto-optical disk, a ROM, a CD-ROM, or a storage device such as a hard disk contained in a computer system. Further, "the recording medium allowing reading by a computer" may also include one configured to dynamically retain a program for a short period of time like a communications line when transmitting a program via a network such as the internet or a communications channel such as a telephone line; or one configured to retain the program for a fixed period of time like a volatile memory inside the computer system serving as the server or client in that case. Further, the above program may be one for realizing a part of the above-mentioned function; further, it may also be one that can be realize the above-mentioned function through a combination of programs already record in the computer system.

Further, it is also possible to realize a part or all of the electronic apparatuses 1 through 5 of the above-described embodiments as integrated circuits such as a large scale integration (LSI). The function blocks of the electronic apparatuses 1 through 5 may be individually formed as processors, or may be formed as processors partially or totally integrated. The integration method is not restricted to LSI; it is also possible to realize the integrated circuit through a dedicated circuit or a general-purpose processor. Further, if there is realized an integration technique taking the place of the LSI as a result of the progress in the semiconductor technology, it is possible to use an integrated circuit formed by such a technique.

The embodiments of the present invention described in detail above with reference to the drawings should not be construed restrictively; regarding the specific construction, it allows various design changes, etc. without departing from the scope of the gist of this invention.

What is claimed is:

1. An electronic apparatus comprising:
    an outer case;
    a piezoelectric element mounted to an inner surface of the outer case and configured to impart vibration to the outer case due to deformation in correspondence with an applied voltage and to generate a voltage corresponding to deformation due to a shock imparted to the outer case;
    an induction element for applying an increased voltage to the piezoelectric element;
    a first switch configured to control whether or not to supply an electric current from a power source to the induction element;
    a second switch configured to effect connection or disconnection between the induction element and the piezoelectric element; and
    a shock detection unit configured to detect a shock imparted to the outer case based on the voltage generated in the piezoelectric element.

2. The electronic apparatus according to claim 1, wherein the first switch performs control so as to supply no electric current to the induction element; and, when the second switch effects disconnection between the induction element and the piezoelectric element, the shock detection unit detects the shock imparted to the outer case.

3. The electronic apparatus according to claim 2, wherein the shock detection unit performs sampling on the voltage generated in the piezoelectric element each time disconnection is effected between the induction element and the piezoelectric element, detecting the shock imparted to the outer case based on the voltage on which sampling has been performed.

4. The electronic apparatus according to claim 1, wherein the shock detection unit compensates for a DC component of the voltage generated in the piezoelectric element.

5. The electronic apparatus according to claim 2, wherein the shock detection unit compensates for a DC component of the voltage generated in the piezoelectric element.

6. The electronic apparatus according to claim 3, wherein the shock detection unit compensates for a DC component of the voltage generated in the piezoelectric element.

7. The electronic apparatus according to claim 2, further comprising a control unit configured to perform control as to whether or not the second switch should disconnect between the induction element and the piezoelectric element based on the voltage generated in the piezoelectric element.

8. The electronic apparatus according to claim 3, further comprising a control unit configured to perform control as to whether or not the second switch should disconnect between the induction element and the piezoelectric element based on the voltage generated in the piezoelectric element.

9. The electronic apparatus according to claim 4, further comprising a control unit configured to perform control as to whether or not the second switch should disconnect between the induction element and the piezoelectric element based on the voltage generated in the piezoelectric element.

10. The electronic apparatus according to claim 5, further comprising a control unit configured to perform control as to whether or not the second switch should disconnect between the induction element and the piezoelectric element based on the voltage generated in the piezoelectric element.

11. The electronic apparatus according to claim 6, further comprising a control unit configured to perform control as to whether or not the second switch should disconnect between the induction element and the piezoelectric element based on the voltage generated in the piezoelectric element.

12. The electronic apparatus according to claim 1, wherein a resistor element is connected in parallel with the induction element.

13. The electronic apparatus according to claim 2, wherein a resistor element is connected in parallel with the induction element.

14. The electronic apparatus according to claim 3, wherein a resistor element is connected in parallel with the induction element.

15. The electronic apparatus according to claim 4, wherein a resistor element is connected in parallel with the induction element.

16. The electronic apparatus according to claim 5, wherein a resistor element is connected in parallel with the induction element.

17. The electronic apparatus according to claim 6, wherein a resistor element is connected in parallel with the induction element.

18. The electronic apparatus according to claim 12, wherein the piezoelectric element is connected to one end of the resistor element; and the other end of the resistor element is grounded.

19. The electronic apparatus according to claim 1, further comprising a switch control unit configured to effect disconnection between one end and the other end of the first switch and to effect connection between the one end and the other end of the first switch before the second switch disconnects between the induction element and the piezoelectric element;
    wherein the one end of the first switch is connected to the induction element and the piezoelectric element, and the other end of the first switch is grounded via a resistor element.

20. A shock detection method for an electronic apparatus comprising: an outer case; a piezoelectric element configured to impart vibration to the outer case due to deformation in correspondence with an applied voltage and to generate a voltage corresponding to the deformation due to a shock imparted to the outer case; and an induction element for applying an increased voltage to the piezoelectric element, the method comprising:
- a first step of performing control as to whether or not to supply an electric current from a power source to the induction element;
- a second step of connecting or disconnecting between the induction element and the piezoelectric element; and
- a third step of detecting a shock imparted to the outer case based on the voltage generated in the piezoelectric element.

* * * * *